US011585281B2

(12) United States Patent
Fujitomi et al.

(10) Patent No.: US 11,585,281 B2
(45) Date of Patent: Feb. 21, 2023

(54) DEVICE FOR CONTROLLING GAS TURBINE, GAS TURBINE FACILITY, METHOD FOR CONTROLLING GAS TURBINE, AND PROGRAM FOR CONTROLLING GAS TURBINE

(71) Applicant: Mitsubishi Power, Ltd., Kanagawa (JP)

(72) Inventors: Yosuke Fujitomi, Yokohama (JP); Tsukasa Ito, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 50 days.

(21) Appl. No.: 17/275,522

(22) PCT Filed: Oct. 7, 2019

(86) PCT No.: PCT/JP2019/039432
§ 371 (c)(1),
(2) Date: Mar. 11, 2021

(87) PCT Pub. No.: WO2020/095593
PCT Pub. Date: May 14, 2020

(65) Prior Publication Data
US 2022/0042466 A1 Feb. 10, 2022

(30) Foreign Application Priority Data
Nov. 8, 2018 (JP) .............................. JP2018-210553

(51) Int. Cl.
*F02C 9/32* (2006.01)
*F02C 9/50* (2006.01)
*F02C 9/20* (2006.01)

(52) U.S. Cl.
CPC .................. *F02C 9/32* (2013.01); *F02C 9/20* (2013.01); *F02C 9/50* (2013.01); *F05D 2220/32* (2013.01); *F05D 2270/05* (2013.01)

(58) Field of Classification Search
CPC ................. F02C 9/50; F02C 9/32; F02C 9/20
See application file for complete search history.

(56) References Cited

U.S. PATENT DOCUMENTS 3,797,233 A * 3/1974 Webb .................. F04D 27/0284
60/236
3,866,109 A * 2/1975 Reed ........................ F02C 9/50
700/282

(Continued)

FOREIGN PATENT DOCUMENTS

| JP | 6-117277 | 4/1994 |
| JP | 9-125987 | 5/1997 |

(Continued)

OTHER PUBLICATIONS

International Search Report dated Dec. 17, 2019 in International (PCT) Application No. PCT/JP2019/039432, with English-language translation.

(Continued)

*Primary Examiner* — Katheryn A Malatek
(74) *Attorney, Agent, or Firm* — Wenderoth, Lind & Ponack, L.L.P.

(57) ABSTRACT

A control device includes a load fuel quantity calculation unit, an allowable fuel quantity calculation unit, a flow rate low value selection unit, a basic drive quantity calculation unit, a fuel deviation calculation unit, and a correction unit. The load fuel quantity calculation unit determines a load fuel quantity based on a required output. The allowable fuel quantity calculation unit determines an allowable fuel quantity to protect a gas turbine. The flow rate low value selection unit selects a minimum fuel quantity from among the determined fuel quantities. The basic drive quantity calculation unit determines a basic drive quantity of an air intake quantity regulator. The fuel deviation calculation unit determines a fuel deviation between the allowable fuel quantity (Continued)

and the minimum fuel quantity. The correction value calculation unit determines a correction value corresponding to the fuel deviation which is then used to correct the basic drive quantity.

16 Claims, 9 Drawing Sheets

(56) References Cited

U.S. PATENT DOCUMENTS

| | | | |
|---|---|---|---|
| 3,973,391 A * | 8/1976 | Reed | F01K 23/105 |
| | | | 290/40 C |
| 2007/0031238 A1 * | 2/2007 | Fujii | F04D 27/0246 |
| | | | 415/48 |
| 2009/0301097 A1 * | 12/2009 | Deuker | F02C 9/54 |
| | | | 60/773 |
| 2014/0156165 A1 * | 6/2014 | Ewens | F02C 9/00 |
| | | | 701/100 |
| 2017/0254282 A1 * | 9/2017 | Sonoda | F02C 9/28 |
| 2018/0016983 A1 * | 1/2018 | Sonoda | F02C 9/00 |

FOREIGN PATENT DOCUMENTS

| | | |
|---|---|---|
| JP | 2002-021509 | 1/2002 |
| JP | 3716018 | 9/2005 |
| JP | 2008-075578 | 4/2008 |
| JP | 2009-019528 | 1/2009 |
| JP | 4427532 | 12/2009 |
| JP | 2016-061242 | 4/2016 |

OTHER PUBLICATIONS

Written Opinion of the International Searching Authority dated Dec. 17, 2019 in International (PCT) Application No. PCT/JP2019/039432, with English-language translation.

* cited by examiner

DEVICE FOR CONTROLLING GAS TURBINE, GAS TURBINE FACILITY, METHOD FOR CONTROLLING GAS TURBINE, AND PROGRAM FOR CONTROLLING GAS TURBINE

TECHNICAL FIELD

The present invention relates to control of a gas turbine.

The present application claims priority based on Japanese Patent Application No. 2018-210553 filed in Japan on Nov. 8, 2018, and this content is incorporated herein by reference.

BACKGROUND ART

The gas turbine includes a compressor that compresses air to generate compressed air, a combustor that burns fuel in the compressed air to generate combustion gas, and a turbine that is driven by the combustion gas. The compressor has a compressor rotor that rotates around an axis, a compressor casing that rotatably covers the compressor rotor, and an inlet guide vane (IGV) that regulates an intake amount which is air that flows into the casing. A fuel line is connected to the combustor. This fuel line is provided with a fuel regulation valve that regulates a flow rate of the fuel supplied to the combustor.

In a case where an output of the gas turbine is increased or decreased, an opening degree of the fuel regulation valve is increased to increase the flow rate of the fuel supplied to the combustor. The opening degree of the fuel regulation valve is determined by, for example, an external load command or the like. The IGV opening degree is basically regulated to be gradually increased as the output of the gas turbine is increased.

Japanese Unexamined Patent Publication No. 2008-075578 describes a control method of the gas turbine described above. In this control method, the IGV opening degree is obtained by adding a first correction value and a second correction value to the basic IGV opening that is gradually increased as the output of the gas turbine is increased, and an opening command value indicating this IGV opening degree is sent to the IGV. The first correction value is a value determined according to a deviation between a temperature of exhaust gas exhausted from the gas turbine and an allowable temperature with respect to the temperature of the exhaust gas. The second correction value is a value determined according to a required output change rate, which is an amount of change in a required output per unit time when the required output for the gas turbine is increased. This second correction value is a value that increases as the required output change rate increases.

Patent Literature

In the control method described in Japanese Unexamined Patent Publication No. 2008-075578, when the increase or decrease in the required output is repeated many times within a short period of time, the IGV opening degree is increased during the period due to the influence of the second correction value. When the IGV opening degree is increased, the intake amount, which is the flow rate of the air sucked by the compressor, is increased and the temperature of the combustion gas at an inlet of the turbine is lowered. Therefore, damage to the gas turbine can be suppressed. On the other hand, when the IGV opening degree becomes larger than necessary, energy consumed by the compressor increases with respect to output energy of the turbine alone. Therefore, the gas turbine efficiency decreases.

An object of the present invention is to provide a technique capable of suppressing a decrease in gas turbine efficiency while suppressing damage to a gas turbine.

SUMMARY OF THE INVENTION

A control device of a gas turbine of one aspect according to the invention for achieving the above object is the following control device of the gas turbine.

The gas turbine includes a compressor that compresses air, a combustor that burns fuel in the air compressed by the compressor to generate combustion gas, a turbine driven by the combustion gas, and a fuel regulation valve that regulates a flow rate of the fuel supplied to the combustor. The compressor has a rotating compressor rotor, a compressor casing that covers the compressor rotor, and an intake amount regulator that regulates an intake amount that is a flow rate of the air flowing into the compressor casing.

The control device of this aspect includes a load fuel amount calculation unit that receives an actual output, which is an actual output of the gas turbine, and a required output required for the gas turbine to obtain a load fuel amount determined according to an output deviation which is a deviation between the actual output and the required output; an allowable fuel amount calculation unit that receives a parameter necessary for protecting the gas turbine from damage and uses the parameter to obtain an allowable fuel amount capable of protecting the gas turbine; a low flow rate value selector that selects a minimum fuel amount, which is the minimum fuel amount among fuel amounts obtained by the load fuel amount calculation unit and the allowable fuel amount calculation unit; a valve command output unit that obtains an opening degree of the fuel regulation valve according to the minimum fuel amount selected by the low flow rate value selector and outputs a valve command value indicating the opening degree to the fuel regulation valve; a basic drive amount calculation unit that receives the actual output to obtain a basic drive amount which is a drive amount of the intake amount regulator determined according to the actual output; a fuel deviation calculation unit that obtains a fuel deviation which is a deviation between the allowable fuel amount and the minimum fuel amount; a correction value calculation unit that obtains a correction value of the basic drive amount according to the fuel deviation obtained by the fuel deviation calculation unit; a correction unit that corrects the basic drive amount with the correction value; and a regulator command output unit that outputs a regulator command indicating a regulator drive amount, which is the basic drive amount corrected by the correction unit, to the intake amount regulator.

The fuel deviation obtained by the fuel deviation calculation unit of this aspect is one of the parameters indicating that there is an increased probability of damage to the gas turbine. In this aspect, the basic drive amount of the regulator drive amount is corrected according to the magnitude of the fuel deviation. Therefore, in this aspect, the basic drive amount is corrected when the probability of damage to the gas turbine is increased, and the flow rate of the air flowing into the gas turbine is regulated. As a result, in this aspect, when the probability of damage to the gas turbine is increased, the turbine inlet temperature of the combustion gas and the temperature of the exhaust gas in the exhaust duct are regulated, and it is possible to suppress the damage to the gas turbine. Further, in this aspect, when the probability of gas turbine damage is not increased, the basic drive amount is not corrected or the correction value of the basic drive amount is small, and the flow rate of the air flowing into the gas turbine is not substantially regulated. That is, when the probability of gas turbine damage is not increased, the flow rate of air flowing into the gas turbine does not become substantially larger than the flow rate of air corresponding to the basic drive amount. As a result, in this aspect, when the probability of gas turbine damage is not increased, energy consumed by the compressor does not increase with respect to output energy of the turbine alone. Therefore, it is possible to suppress the decrease in gas turbine efficiency.

In the control device of a gas turbine of this aspect, the correction value when the fuel deviation is a first deviation may be equal to or less than the correction value when the fuel deviation is a second deviation smaller than the first deviation.

In the control device of a gas turbine of any one of the above aspects, the correction unit may include a sub-correction value calculation unit that obtains a sub-correction value for correcting a main-correction value which is the correction value, a sub-correction unit that corrects the main-correction value with the sub-correction value, and a main-correction unit that corrects the basic drive amount with the main-correction value corrected by the sub-correction unit to obtain the regulator drive amount. In this case, the sub-correction value calculation unit receives the actual output to obtain the sub-correction value according to the actual output.

The probability of damage to the gas turbine is higher when the actual output is higher than when the actual output is lower. In this aspect, the main-correction value is corrected by the sub-correction value according to the actual output, and the basic drive amount is corrected by the corrected main-correction value. That is, in this aspect, the main-correction value is corrected when the actual output is large and the probability of damage to the gas turbine is high. Accordingly, in this aspect, it is possible to suppress the damage to the gas turbine from this viewpoint as well.

In the control device of a gas turbine of this aspect having the sub-correction value calculation unit, the sub-correction value when the actual output is a first value may be equal to or larger than the sub-correction value when the actual output is a second value smaller than the first value. In this case, the sub-correction unit corrects the main-correction value such that the main-correction value corrected when the sub-correction value is a first value is larger than the main-correction value corrected when the sub-correction value is a second value smaller than the first value.

In the control device of a gas turbine of any one of the above aspects having the sub-correction value calculation unit, the correction unit may have a change rate limiting unit that limits a change rate which is a change amount per unit time of the main-correction value corrected by the sub-correction unit within a predetermined limit value. In this case, the limit value for the change rate when the basic drive amount is increased to increase the intake amount is larger than the limit value for the change rate when the basic drive amount is decreased to decrease the intake amount. The main-correction unit corrects the basic drive amount with the main-correction value whose change rate is limited by the change rate limiting unit.

When the basic drive amount of the gas turbine is large, that is, when the intake amount is large, the fuel amount supplied to the combustor is also large. Therefore, the probability of damage to the gas turbine is higher when the basic drive amount is large than when the basic drive amount is small. In this aspect, the limit value for the correction value change rate when the basic drive amount is increased to increase the intake amount is larger than the limit value for the correction value change rate when the basic drive amount is decreased to decrease the intake amount. Therefore, in this aspect, the correction value change rate when the basic drive amount is increased to increase the intake amount is basically larger than the correction value change rate when the basic drive amount is decreased to decrease the intake amount. Accordingly, in this aspect, it is possible to suppress the damage to the gas turbine from this viewpoint as well.

In the control device of a gas turbine of any one of the above aspects, the correction unit may have a change rate limiting unit that limits a change rate which is a change amount per unit time of the correction value within a predetermined limit value and a main-correction unit that corrects the basic drive amount with the correction value whose change rate is limited by the change rate limiting unit. In this case, the limit value for the change rate when the basic drive amount is increased to increase the intake amount is larger than the limit value for the change rate when the basic drive amount is decreased to decrease the intake amount.

In the control device of a gas turbine of any one of the above aspects, the allowable fuel amount calculation unit may obtain a plurality of types of allowable fuel amounts. In this case, the fuel deviation calculation unit has a sub deviation calculation unit that obtains a deviation from the minimum fuel amount for each of the plurality of types of allowable fuel amounts and a low deviation value selector that selects a minimum deviation, which is the minimum deviation among the deviations for each of the plurality of types of allowable fuel amounts obtained by the sub deviation calculation unit. The correction value calculation unit obtains the correction value according to the minimum deviation.

In the control device of a gas turbine of any one of the above aspects, the turbine may have a turbine rotor that rotates around an axis and a turbine casing that covers the turbine rotor, the turbine rotor may have a rotor shaft portion that rotates around the axis and a plurality of rotor blade rows that are disposed side by side in an axial direction in which the axis extends and are fixed to the rotor shaft portion, the gas turbine may have an exhaust duct that is connected to the turbine casing and through which exhaust gas, which is combustion gas that has passed through a last-stage rotor blade row among the plurality of rotor blade rows, flows. In this case, the allowable fuel amount calculation unit may have an allowable temperature calculation unit that obtains an allowable exhaust gas temperature according to a state of the gas turbine with respect to a temperature of the exhaust gas and an allowable temperature fuel amount calculation unit that receives the temperature of the exhaust gas to obtain an allowable temperature fuel amount determined according to a deviation between the temperature of the exhaust gas and the allowable exhaust gas temperature. In this case, the low flow rate value selector and the fuel deviation calculation unit each process the allowable temperature fuel amount as the allowable fuel amount obtained by the allowable fuel amount calculation unit.

In the control device of a gas turbine of any one of the above aspects, the turbine may have a turbine rotor that rotates around an axis and a turbine casing that covers the turbine rotor, the turbine rotor may have a rotor shaft portion that rotates around the axis and a plurality of rotor blade rows that are disposed side by side in an axial direction in which the axis extends and are fixed to the rotor shaft portion, the gas turbine may have an exhaust duct that is connected to the turbine casing and through which exhaust gas, which is combustion gas that has passed through a last-stage rotor blade row among the plurality of rotor blade rows, flows. In this case, the allowable fuel amount calculation unit may have a first allowable temperature calculation unit that obtains a first allowable temperature, which is an allowable exhaust gas temperature according to a state of the gas turbine, with respect to the temperature of the exhaust gas at a first position on a downstream side of the last-stage rotor blade row in the turbine casing or the exhaust duct, a second allowable temperature calculation unit that obtains a second allowable temperature, which is an allowable exhaust gas temperature according to the state of the gas turbine, with respect to the temperature of the exhaust gas at a second position on a downstream side of the first position in the exhaust duct, a first allowable temperature fuel amount calculation unit that receives the temperature of the exhaust gas at the first position to obtain a first allowable temperature fuel amount determined according to a deviation between the temperature of the exhaust gas at the first position and the first allowable temperature, and a second allowable temperature fuel amount calculation unit that receives the temperature of the exhaust gas at the second position to obtain a second allowable temperature fuel amount determined according to a deviation between the temperature of the exhaust gas at the second position and the second allowable temperature. In this case, the low flow rate value selector processes each of the first allowable temperature fuel amount and the second allowable temperature fuel amount as one of the fuel amounts obtained by the allowable fuel amount calculation unit. The sub deviation calculation unit uses the first allowable temperature fuel amount as one type of allowable fuel amount of a plurality of types of allowable fuel amounts and uses the second allowable temperature fuel amount as another type of allowable fuel amount.

In the control device of a gas turbine of this aspect that obtains a plurality of types of allowable fuel amounts, the allowable fuel amount calculation unit may have a correlation value calculator that obtains an inlet temperature correlation value having a positive correlation with the temperature of the combustion gas at an inlet of the turbine according to a state of the gas turbine, and a change rate limit fuel amount calculator that obtains a change rate limit fuel amount according to the inlet temperature correlation value. In this case, the change rate limit fuel amount calculator obtains the change rate limit fuel amount when the inlet temperature correlation value is equal to or less than a predetermined value and the change rate limit fuel amount when the inlet temperature correlation value is larger than the predetermined value, in a process of increasing the minimum fuel amount. The change rate limit fuel amount when the inlet temperature correlation value is equal to or less than the predetermined value is a value in which a predetermined bias fuel amount is added to the minimum fuel amount and a change rate which is a change amount per unit time of a value obtained by adding the predetermined bias fuel amount to the minimum fuel amount is within a predetermined first limit value. The change rate limit fuel amount when the inlet temperature correlation value is larger than the predetermined value is a value that increases at a change rate equal to or less than a second limit value, which is smaller than the first limit value, from the change rate limit fuel amount when the inlet temperature correlation value is the predetermined value. The low flow rate value selector processes the change rate limit fuel amount as one of the fuel amounts obtained by the allowable fuel amount calculation unit. The sub deviation calculation unit uses the change rate limit fuel amount as one type of allowable fuel amount of a plurality of types of allowable fuel amounts.

Gas turbine equipment of one aspect according to the invention for achieving the above object includes the control device according to any one of the above aspects and the gas turbine.

A control method of a gas turbine of one aspect according to the invention for achieving the above object is the following control method of the gas turbine.

The gas turbine includes a compressor that compresses air, a combustor that burns fuel in the air compressed by the compressor to generate combustion gas, a turbine driven by the combustion gas, and a fuel regulation valve that regulates a flow rate of the fuel supplied to the combustor. The compressor has a rotating compressor rotor, a compressor casing that covers the compressor rotor, and an intake amount regulator that regulates an intake amount that is a flow rate of the air flowing into the compressor casing.

The control method of this aspect executes a load fuel amount calculation step of receiving an actual output, which is an actual output of the gas turbine, and a required output required for the gas turbine to obtain a load fuel amount determined according to an output deviation which is a deviation between the actual output and the required output; an allowable fuel amount calculation step of receiving a parameter necessary for protecting the gas turbine from damage and using the parameter to obtain an allowable fuel amount capable of protecting the gas turbine; a low flow rate value selection step of selecting a minimum fuel amount, which is the minimum fuel amount among the fuel amounts obtained in the load fuel amount calculation step and the allowable fuel amount calculation step; a valve command output step of obtaining an opening degree of the fuel regulation valve according to the minimum fuel amount selected in the low flow rate value selection step and outputting a valve command value indicating the opening degree to the fuel regulation valve; a basic drive amount calculation step of receiving the actual output to obtain a basic drive amount which is a drive amount of the intake amount regulator determined according to the actual output; a fuel deviation calculation step of obtaining a fuel deviation which is a deviation between the allowable fuel amount and the minimum fuel amount; a correction value calculation step of obtaining a correction value of the basic drive amount according to the fuel deviation obtained in the fuel deviation calculation step; a correction step of correcting the basic drive amount with the correction value; and a regulator command output step of outputting a regulator command indicating a regulator drive amount, which is the basic drive amount corrected in the correction step, to the intake amount regulator.

In the control method of a gas turbine of the above aspect, the correction step may include a sub-correction value calculation step of obtaining a sub-correction value for correcting a main-correction value which is the correction value, a sub-correction step of correcting the main-correction value with the sub-correction value, and a main-correction step of correcting the basic drive amount with the main-correction value corrected in the sub-correction step to obtain the regulator drive amount. In this case, in the sub-correction value calculation step, the actual output is received to obtain the sub-correction value according to the actual output.

In the control method of a gas turbine of this aspect that executes the sub-correction value calculation step, the correction step may include a change rate limiting step of limiting a change rate which is a change amount per unit time of the main-correction value corrected in the sub-correction step within a predetermined limit value. In this case, the limit value for the change rate when the basic drive amount is increased to increase the intake amount is larger than the limit value for the change rate when the basic drive amount is decreased to decrease the intake amount. In the main-correction step, the basic drive amount is corrected with the main-correction value whose change rate is limited in the change rate limiting step.

In the control method of a gas turbine according to any one of the above aspects, in the allowable fuel amount calculation step, a plurality of types of allowable fuel amounts are obtained. In this case, the fuel deviation calculation step includes a sub deviation calculation step of obtaining a deviation from the minimum fuel amount for each of the plurality of types of allowable fuel amounts, and a low deviation value selection step of selecting a minimum deviation, which is the minimum deviation among the deviations for each of the plurality of types of allowable fuel amounts obtained in the sub deviation calculation step. In the correction value calculation step, a correction value of the basic drive amount according to the minimum deviation is obtained.

In the control method of a gas turbine according to any one of the above aspects, the turbine may have a turbine rotor that rotates around an axis and a turbine casing that covers the turbine rotor, the turbine rotor may have a rotor shaft portion that rotates around the axis and a plurality of rotor blade rows that are disposed side by side in an axial direction in which the axis extends and are fixed to the rotor shaft portion, the gas turbine may have an exhaust duct that is connected to the turbine casing and through which exhaust gas, which is combustion gas that has passed through a last-stage rotor blade row among the plurality of rotor blade rows, flows. In this case, the allowable fuel amount calculation step may include an allowable temperature calculation step of obtaining an allowable exhaust gas temperature according to a state of the gas turbine with respect to a temperature of the exhaust gas and an allowable temperature fuel amount calculation step of receiving the temperature of the exhaust gas to obtain an allowable temperature fuel amount determined according to a deviation between the temperature of the exhaust gas and the allowable exhaust gas temperature. The low flow rate value selection step and the fuel deviation calculation step each process the allowable temperature fuel amount as the allowable fuel amount obtained in the allowable fuel amount calculation step.

In the control method of a gas turbine of the above aspect that obtains the plurality of types of allowable fuel amounts, the turbine may have a turbine rotor that rotates around an axis and a turbine casing that covers the turbine rotor, the turbine rotor may have a rotor shaft portion that rotates around the axis and a plurality of rotor blade rows that are disposed side by side in an axial direction in which the axis extends and are fixed to the rotor shaft portion, the gas turbine may have an exhaust duct that is connected to the turbine casing and through which exhaust gas, which is combustion gas that has passed through a last-stage rotor blade row among the plurality of rotor blade rows, flows. In this case, the allowable fuel amount calculation step may include a first allowable temperature calculation step of obtaining a first allowable temperature, which is an allowable exhaust gas temperature according to a state of the gas turbine, with respect to the temperature of the exhaust gas at a first position on a downstream side of the last-stage rotor blade row in the turbine casing or the exhaust duct, a second allowable temperature calculation step of obtaining a second allowable temperature, which is an allowable exhaust gas temperature according to the state of the gas turbine, with respect to the temperature of the exhaust gas at a second position on a downstream side of the first position in the exhaust duct, a first allowable temperature fuel amount calculation step of receiving the temperature of the exhaust gas at the first position to obtain a first allowable temperature fuel amount determined according to a deviation between the temperature of the exhaust gas at the first position and the first allowable temperature, and a second allowable temperature fuel amount calculation step of receiving the temperature of the exhaust gas at the second position to obtain a second allowable temperature fuel amount determined according to a deviation between the temperature of the exhaust gas at the second position and the second allowable temperature. In the low flow rate value selection step, each of the first allowable temperature fuel amount and the second allowable temperature fuel amount is processed as one of the fuel amounts obtained in the allowable fuel amount calculation step. In the sub deviation calculation step, the first allowable temperature fuel amount is used as one type of allowable fuel amount of the plurality of types of allowable fuel amounts, and the second allowable temperature fuel amount is used as another type of allowable fuel amount.

In the control method of a gas turbine of the above aspect that obtains the plurality of types of allowable fuel amounts, the allowable fuel amount calculation step may include a correlation value calculation step of obtaining an inlet temperature correlation value having a positive correlation with the temperature of the combustion gas at an inlet of the turbine according to a state of the gas turbine, and a change rate limit fuel amount calculation step of obtaining a change rate limit fuel amount according to the inlet temperature correlation value. In the change rate limit fuel amount calculation step, the change rate limit fuel amount when the inlet temperature correlation value is equal to or less than a predetermined value and the change rate limit fuel amount when the inlet temperature correlation value is larger than the predetermined value are obtained in a process of increasing the minimum fuel amount. The change rate limit fuel amount when the inlet temperature correlation value is equal to or less than the predetermined value is a value in which a predetermined bias fuel amount is added to the minimum fuel amount and a change rate which is a change amount per unit time of a value obtained by adding the predetermined bias fuel amount to the minimum fuel amount is within a predetermined first limit value. The change rate limit fuel amount when the inlet temperature correlation value is larger than the predetermined value is a value that increases at a change rate equal to or less than a second limit value, which is smaller than the first limit value, from the change rate limit fuel amount when the inlet temperature correlation value is the predetermined value. In the low flow rate value selection step, the change rate limit fuel amount is processed as one of the fuel amounts obtained in the allowable fuel amount calculation step. In the sub deviation calculation step, the change rate limit fuel amount is used as one type of allowable fuel amount of the plurality of types of allowable fuel amounts.

A control program of a gas turbine of one aspect according to the invention for achieving the above object is the following control program of the gas turbine.

The gas turbine includes a compressor that compresses air, a combustor that burns fuel in the air compressed by the compressor to generate combustion gas, a turbine driven by the combustion gas, and a fuel regulation valve that regulates a flow rate of the fuel supplied to the combustor. The compressor has a rotating compressor rotor, a compressor casing that covers the compressor rotor, and an intake amount regulator that regulates an intake amount that is a flow rate of the air flowing into the compressor casing.

The control program of this aspect causes a computer to execute a load fuel amount calculation step of receiving an actual output, which is an actual output of the gas turbine, and a required output required for the gas turbine to obtain a load fuel amount determined according to an output deviation which is a deviation between the actual output and the required output; an allowable fuel amount calculation step of receiving a parameter necessary for protecting the gas turbine from damage and using the parameter to obtain an allowable fuel amount capable of protecting the gas turbine; a low flow rate value selection step of selecting a minimum fuel amount, which is the minimum fuel amount among the fuel amounts obtained in the load fuel amount calculation step and the allowable fuel amount calculation step; a valve command output step of obtaining an opening degree of the fuel regulation valve according to the minimum fuel amount selected in the low flow rate value selection step and outputting a valve command value indicating the opening degree to the fuel regulation valve; a basic drive amount calculation step of receiving the actual output to obtain a basic drive amount which is a drive amount of the intake amount regulator determined according to the actual output; a fuel deviation calculation step of obtaining a fuel deviation which is a deviation between the allowable fuel amount and the minimum fuel amount; a correction value calculation step of obtaining a correction value of the basic drive amount according to the fuel deviation obtained in the fuel deviation calculation step; a correction step of correcting the basic drive amount with the correction value; and a regulator command output step of outputting a regulator command indicating a regulator drive amount, which is the basic drive amount corrected in the correction step, to the intake amount regulator.

Advantageous Effects of Invention

According to one aspect of the present invention, it is possible to suppress the decrease in gas turbine efficiency while suppressing damage to the gas turbine.

DESCRIPTION OF EMBODIMENTS

Hereinafter, an embodiment of gas turbine equipment according to the present invention will be described in detail with reference to drawings.

Figure 1:
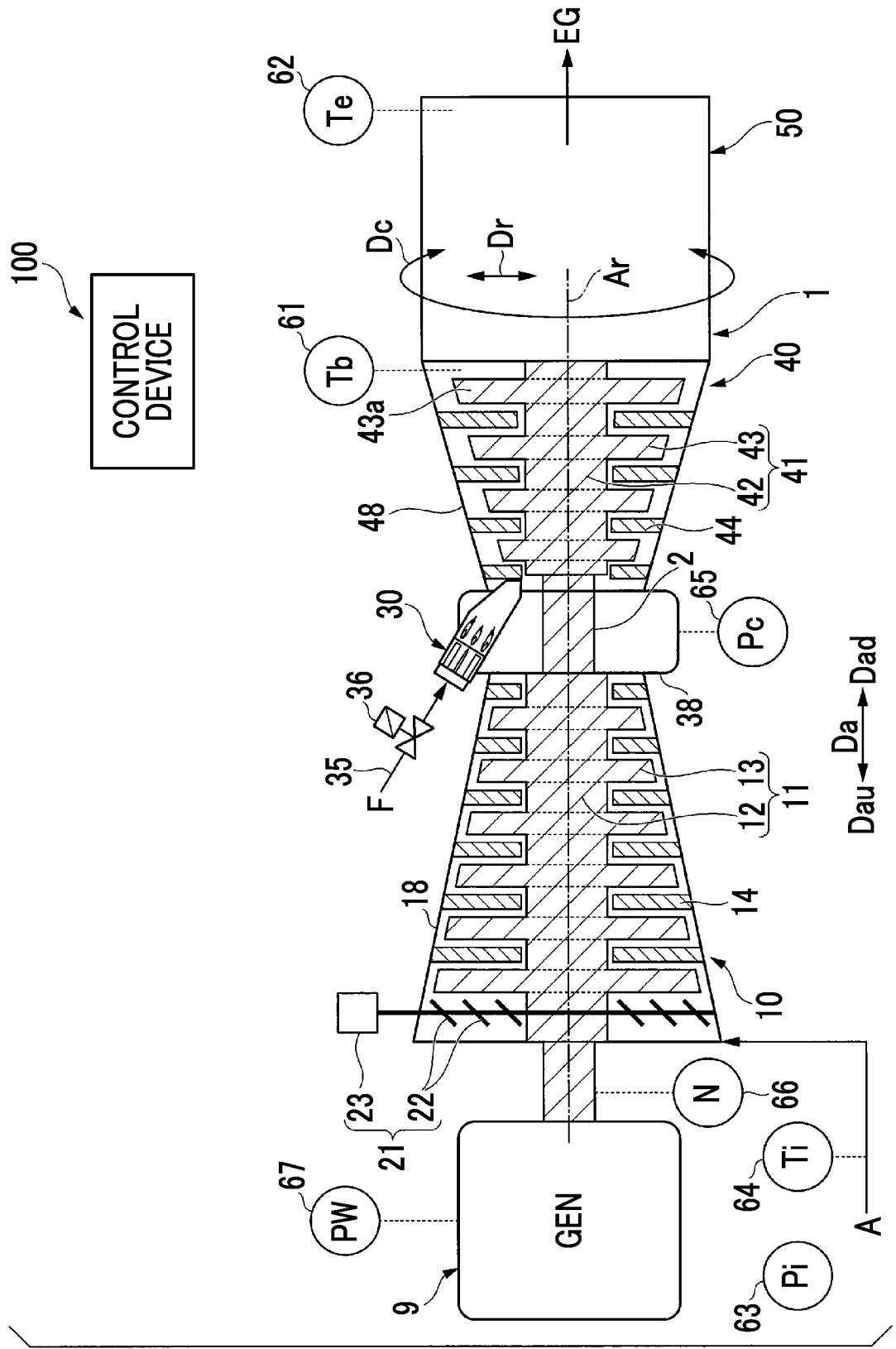
FIG. 1 is a schematic cross-sectional view of gas turbine equipment according to an embodiment of the present invention.

As shown in FIG. 1, the gas turbine equipment of the present embodiment includes a gas turbine 1, a generator 9 that generates electricity by driving the gas turbine 1, a detector that detects various state quantities or the like of the gas turbine 1, and a control device 100.

The gas turbine 1 includes a compressor 10 that compresses air A, a combustor 30 that burns fuel F in the air compressed by the compressor 10 to generate combustion gas, a turbine 40 that is driven by the combustion gas, and an exhaust duct 50.

The compressor 10 has a compressor rotor 11 that rotates around an axis Ar, a compressor casing 18 that covers the compressor rotor 11, a plurality of stator blade rows 14, and an inlet guide vane (IGV) device (intake amount regulator) 21 that regulates a flow rate of the air A that flows into the compressor casing 18.

In the following, a direction in which the axis Ar extends is referred to as an axial direction Da, one side of the axial direction Da is referred to as an axis upstream side Dau, and the other side thereof is referred to as an axis downstream side Dad. The axis upstream side Dau is an upstream side of the air flow in the compressor 10 and an upstream side of the combustion gas flow in the turbine 40. The axis downstream side Dad is a downstream side of the air flow in the compressor 10 and a downstream side of the combustion gas flow in the turbine 40. A circumferential direction with the axis Ar as the center is simply referred to as a circumferential direction Dc, and a direction perpendicular to the axis Ar is referred to as a radial direction Dr.

The compressor rotor 11 has a rotor shaft portion 12 extending in the axial direction Da with the axis Ar as the center and a plurality of rotor blade rows 13 attached to the rotor shaft portion 12. The plurality of rotor blade rows 13 are disposed side by side in the axial direction Da. Each of the rotor blade rows 13 is composed of a plurality of rotor blades disposed side by side in the circumferential direction Dc. A stator blade row 14 is disposed on the axis downstream side Dad of each axis of the plurality of rotor blade rows 13. Each of the stator blade rows 14 is provided inside the compressor casing 18. Each of the stator blade rows 14 is composed of a plurality of stator blades disposed side by side in the circumferential direction Dc.

The IGV device (intake amount regulator) 21 is provided in the compressor casing 18. The IGV device 21 has a plurality of movable blades 22 and a driver 23 that changes an angle of the plurality of movable blades 22. The plurality of movable blades 22 are disposed on the axis upstream side Dau of the rotor blade row 13 on the most axis upstream side Dau, among the plurality of rotor blade rows 13.

The turbine 40 has a turbine rotor 41 that rotates around the axis Ar, a turbine casing 48 that covers the turbine rotor 41, and a plurality of stator blade rows 44. The turbine rotor 41 has a rotor shaft portion 42 extending in the axial direction Da with the axis Ar as the center and a plurality of rotor blade rows 43 attached to the rotor shaft portion 42. The plurality of rotor blade rows 43 are disposed side by side in the axial direction Da. Each of the rotor blade rows 43 is composed of a plurality of rotor blades disposed side by side in the circumferential direction Dc. The stator blade row 44 is disposed on each axis upstream side Dau of the plurality of rotor blade rows 43. Each of the stator blade rows 44 is provided inside the turbine casing 48. Each of the stator blade rows 44 is composed of a plurality of stator blades disposed side by side in the circumferential direction Dc. In the following, the combustion gas that has passed through a last-stage rotor blade row 43a, which is a rotor blade row on the most axis downstream side Dad among the plurality of rotor blade rows 43, is referred to as exhaust gas EG.

The compressor rotor 11 and the turbine rotor 41 are located on the same axis Ar and are connected to each other to form a gas turbine rotor 2. A rotor of the generator 9 is connected to the gas turbine rotor 2. The gas turbine 1 further includes an intermediate casing 38. The intermediate casing 38 is connected to an end of the compressor casing 18 on the axis downstream side Dad. The turbine casing 48 is connected to an end of the intermediate casing 38 on the axis downstream side Dad. The compressed air discharged from the compressor casing 18 flows into the intermediate casing 38.

The combustor 30 is provided in the intermediate casing 38. A fuel line 35 through which the fuel F from a fuel supply source flows is connected to the combustor 30. The fuel line 35 is provided with a fuel regulation valve 36.

The exhaust duct 50 is connected to an end of the turbine casing 48 on the axis downstream side Dad. The exhaust gas EG exhausted from the turbine 40 flows through the exhaust duct 50.

In the present embodiment, the detector that detects various state quantities or the like of the gas turbine 1 includes an atmospheric pressure sensor 63 that detects atmospheric pressure, an intake temperature sensor 64 that detects a temperature of air sucked by the compressor 10, a casing pressure sensor 65 that detects a pressure inside the intermediate casing 38, that is, a pressure of the compressed air flowing into the combustor 30, a first temperature sensor 61 and a second temperature sensor 62 that detect a temperature of the exhaust gas EG, a rotation speed meter 66 that detects a rotation speed of the gas turbine rotor 2, and an output meter 67 that detects an output of the generator 9, that is, an actual output PWr of the gas turbine 1. The first temperature sensor 61 detects a temperature Tb of the exhaust gas EG at a position (first position) of the last-stage rotor blade row 43a on the axis downstream side Dad in the turbine casing 48. The second temperature sensor 62 detects a temperature Te of the exhaust gas EG at a position (second position) on the axis downstream side Dad in the exhaust duct 50. The first temperature sensor 61 may detect a temperature of the exhaust gas EG at a position of the axis upstream side Dau in the exhaust duct 50.

Figure 2:
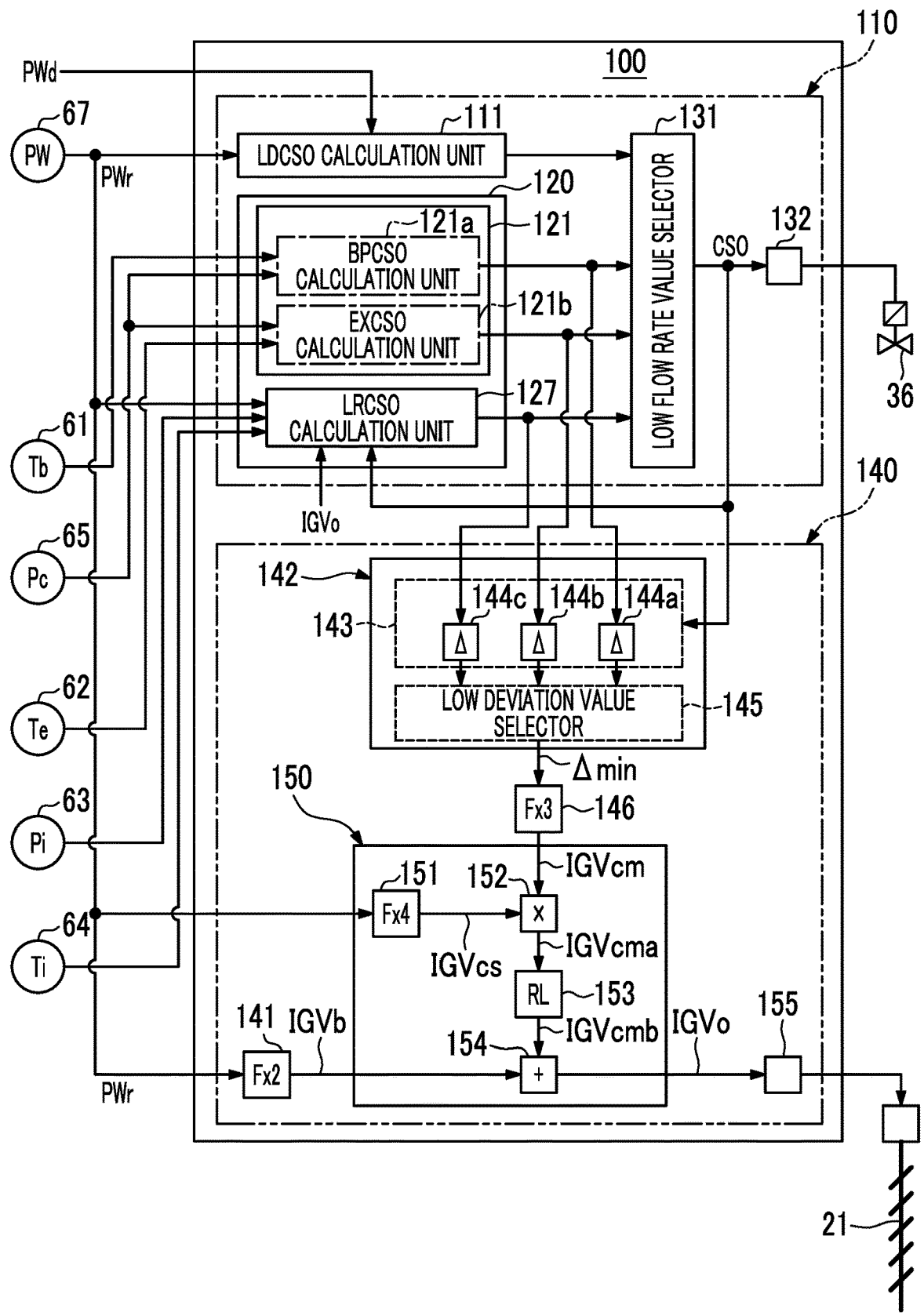
FIG. 2 is a functional block diagram of a control device according to an embodiment of the present invention.

As shown in FIG. 2, the control device 100 has a fuel control unit 110 that controls the fuel regulation valve 36 and an IGV control unit 140 that controls the IGV device 21.

The fuel control unit 110 has a load fuel amount calculation unit (LDCSO calculation unit) 111 that obtains a load fuel amount LDCSO, an allowable fuel amount calculation unit 120 that obtains an allowable fuel amount, a low flow rate value selector 131, and a valve command output unit 132. The low flow rate value selector 131 selects a minimum fuel amount CSO, which is the minimum fuel amount among the fuel amounts obtained by the LDCSO calculation unit 111 and the allowable fuel amount calculation unit 120. The fuel amount in the above description is a flow rate of the fuel. The valve command output unit 132 outputs a valve command value to the fuel regulation valve 36.

Figure 3:
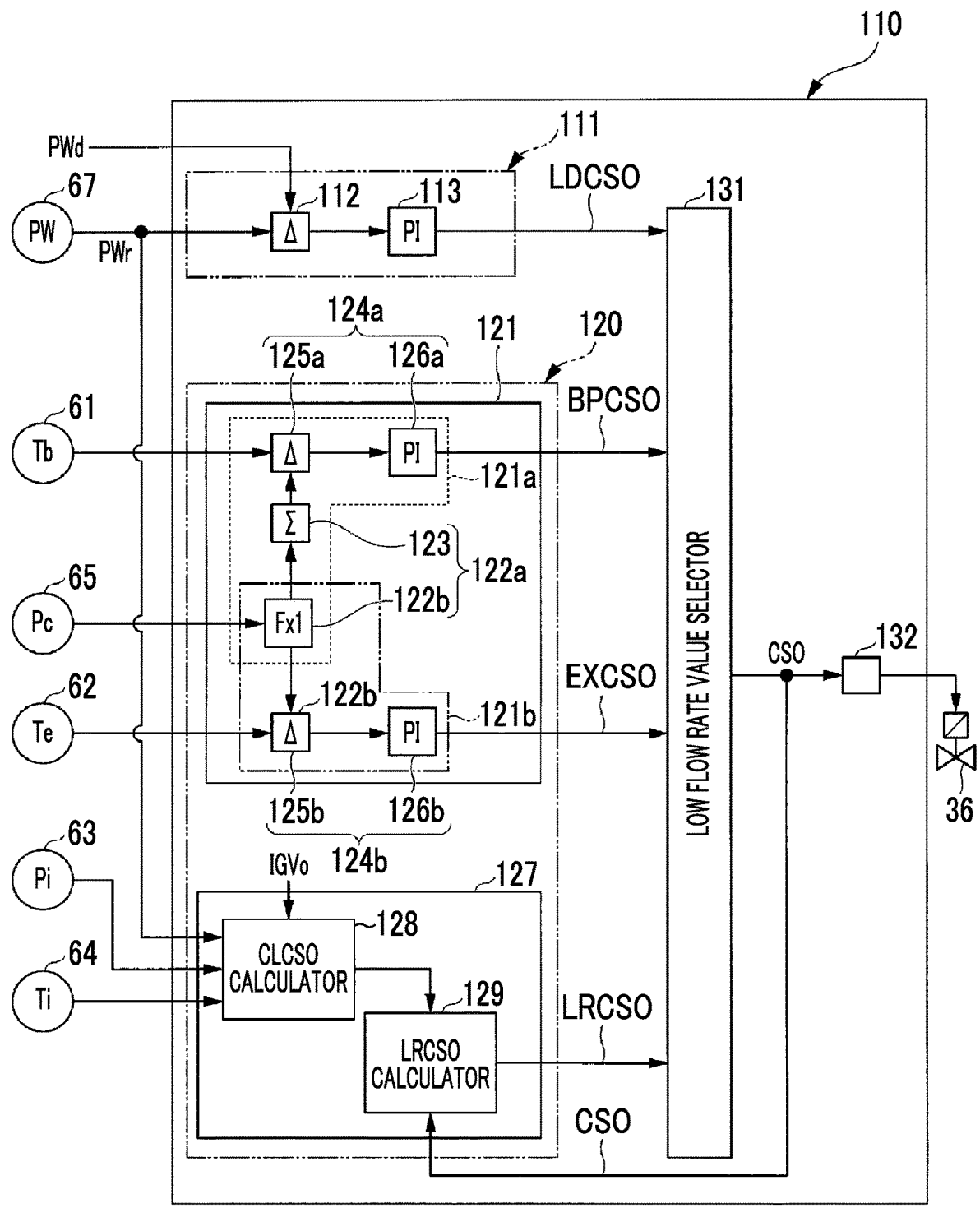
FIG. 3 is a functional block diagram of a fuel control unit according to an embodiment of the present invention.

As shown in FIG. 3, the LDCSO calculation unit 111 has a differentiator 112 and a PI controller 113. The differentiator 112 receives a required output PWd from outside and the actual output PWr which is an actual output of the gas turbine 1 detected by the output meter 67 to obtain a deviation between the required output PWd and the actual output PWr. The PI controller 113 outputs a proportional and integral control amount according to the deviation as the load fuel amount LDCSO.

The allowable fuel amount calculation unit 120 has an allowable temperature fuel amount calculation unit 121 that obtains an allowable temperature fuel amount and a change rate limit fuel amount calculation unit (LRCSO calculation unit) 127 that obtains a change rate limit fuel amount LRCSO. The allowable temperature fuel amount calculation unit 121 has a first allowable temperature fuel amount calculation unit (BPCSO calculation unit) 121a that obtains a first allowable temperature fuel amount BPCSO and a second allowable temperature fuel amount calculation unit (EXCSO calculation unit) 121b that obtains the second allowable temperature fuel amount EXCSO.

The BPCSO calculation unit 121a has a first allowable temperature calculation unit 122a that obtains a first allowable temperature, which is an allowable temperature of the exhaust gas EG at the above first position of the gas turbine 1, and a first allowable temperature fuel amount calculation unit (BPCSO calculation unit) 124a that obtains the first allowable temperature fuel amount BPCSO corresponding to the first allowable temperature. The first allowable temperature calculation unit 122a has a second allowable temperature calculation unit 122b and a temperature bias device 123. The second allowable temperature calculation unit 122b obtains a second allowable temperature, which is an allowable temperature of the exhaust gas EG at the above second position of the gas turbine 1. The temperature bias device 123 adds a predetermined temperature bias to the second allowable temperature to obtain the first allowable temperature. The BPCSO calculation unit 124a has a differentiator 125a and a PI controller 126a. The differentiator 125a receives the first allowable temperature and the temperature Tb of the exhaust gas EG detected by the first temperature sensor 61 to obtain a deviation between the first allowable temperature and the temperature Tb of the exhaust gas EG. The PI controller 126a sets a proportional and integral control amount according to the deviation as the first allowable temperature fuel amount BPCSO.

The EXCSO calculation unit 121b has the above second allowable temperature calculation unit 122b and a second allowable temperature fuel amount calculation unit (EXCSO calculation unit) 124b that obtains the second allowable temperature fuel amount EXCSO corresponding to the second allowable temperature. The EXCSO calculation unit 124b has a differentiator 125b and a PI controller 126b. The differentiator 125b receives the second allowable temperature and the temperature Te of the exhaust gas EG detected by the second temperature sensor 62 to obtain a deviation between the second allowable temperature and the temperature Te of the exhaust gas EG. The PI controller 126b sets a proportional and integral control amount according to the deviation as the second allowable temperature fuel amount EXCSO.

As described above, the second allowable temperature calculation unit 122b is a shared component between the BPCSO calculation unit 121a and the EXCSO calculation unit 121b. The second allowable temperature calculation unit 122b receives a casing pressure Pc detected by the casing pressure sensor 65 to obtain the second allowable temperature according to the casing pressure Pc by using a function Fx1.

Figure 4:
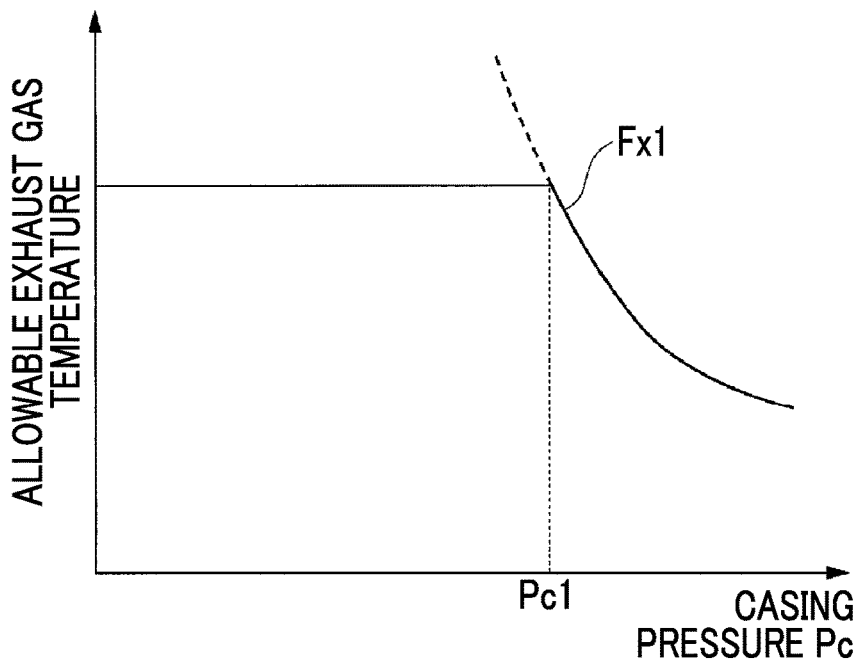
FIG. 4 is a graph showing a relationship between a casing pressure and an allowable exhaust gas temperature.

The function Fx1 will be described with reference to FIG. 4.

The relationship of the casing pressure Pc detected by the casing pressure sensor 65 and the temperature Te of the exhaust gas EG at the second position is such that the temperature Te of the exhaust gas EG decreases as the casing pressure Pc increases in a case where a turbine inlet temperature, which is a temperature of the combustion gas at an inlet of the turbine 40, is made constant. Therefore, in a case where an allowable turbine inlet temperature determined from the viewpoint of protecting, and the like, the turbine 40 or the exhaust duct 50 is maintained, the allowable exhaust gas temperature corresponding to the allowable turbine inlet temperature also decreases as the casing pressure Pc increases. On the other hand, in a case where the casing pressure Pc is equal to or less than a certain value Pc1, the allowable exhaust gas temperature is constant regardless of the casing pressure Pc from the viewpoint of protecting, and the like, the exhaust duct 50.

The function Fx1 is a function indicating a relationship between the casing pressure Pc and the allowable exhaust gas temperature described above. That is, the function Fx1 indicates a constant allowable exhaust gas temperature in a case where the casing pressure Pc is equal to or less than the certain value Pc1, and indicates the allowable exhaust gas temperature that decreases as the casing pressure Pc increases in a case where the casing pressure Pc is larger than the certain value Pc1.

In order to obtain the allowable exhaust gas temperature according to a status, the casing pressure Pc may be corrected by an air temperature Ti detected by the intake temperature sensor 64 or an atmospheric pressure Pi detected by the atmospheric pressure sensor 63. In this case, the function Fx1 is used to obtain the allowable exhaust gas temperature according to the corrected casing pressure Pc.

The LRCSO calculation unit 127 has an inlet temperature correlation value calculator (CLCSO calculator) 128 and a change rate limit fuel amount calculator (LRCSO calculator) 129. The CLCSO calculator 128 obtains an inlet temperature correlation value CLCSO that has a positive correlation with the turbine inlet temperature. The LRCSO calculator 129 obtains the change rate limit fuel amount LRCSO according to the inlet temperature correlation value CLCSO.

The inlet temperature correlation value CLCSO is a non-dimensional parameter of the turbine inlet temperature and is a parameter having a positive correlation with the turbine inlet temperature. The inlet temperature correlation value CLCSO is set to be 0% when the turbine inlet temperature is a lower limit value and 100% when the turbine inlet temperature is an upper limit value. For example, when the lower limit value of the turbine inlet temperature is 700° C. and the upper limit value of the turbine inlet temperature is 1500° C., the inlet temperature correlation value CLCSO is represented by the following equation (1).

$$\text{CLCSO (\%)}=\{(\text{Actual output}-700°\text{ C. MW})/(1500°\text{ C. MW}-700°\text{ C. MW})\}\times 100 \quad (1)$$

The 700° C. MW is an output (generator output) of the gas turbine 1 when the turbine inlet temperature is 700° C., which is the lower limit value under a current environment where the gas turbine 1 is placed. The 1500° C. MW is an output (generator output) of the gas turbine 1 when the turbine inlet temperature is 1500° C. which is the upper limit value, under the current environment of the gas turbine 1.

The CLCSO calculator 128 receives the air temperature Ti detected by the intake temperature sensor 64, the atmospheric pressure Pi detected by the atmospheric pressure sensor 63, and an IGV opening degree IGVo in order to recognize the current environment where the gas turbine 1 is placed. As will be described below, the IGV opening degree IGVo is an opening degree of the IGV device 21 indicated by an IGV command output from the IGV control unit 140 to the IGV device 21. The CLCSO calculator 128 determines the 700° C. MW and the 1500° C. MW by using the air temperature Ti, the atmospheric pressure Pi, and the IGV opening degree IGVo. The CLCSO calculator 128 has 700° C. MW and 1500° C. MW when the gas turbine 1 is under a standard environment. The CLCSO calculator 128 corrects the 700° C. MW and the 1500° C. MW under the standard environment by using the air temperature Ti, the atmospheric pressure Pi, and the IGV opening degree IGVo to obtain the 700° C. MW and the 1500° C. MW under the current environment. The CLCSO calculator 128 substitutes these 700° C. MW and 1500° C. MW and the actual output PWr detected by the output meter 67 into the equation (1) to obtain the inlet temperature correlation value CLCSO.

In the above description, the lower limit value of the turbine inlet temperature has been set to 700° C., and the upper limit value has been set to 1500° C. However, the lower limit value and the upper limit value of the turbine inlet temperature are different from the above examples depending on a model of the combustor 30 or the like.

Figure 5:
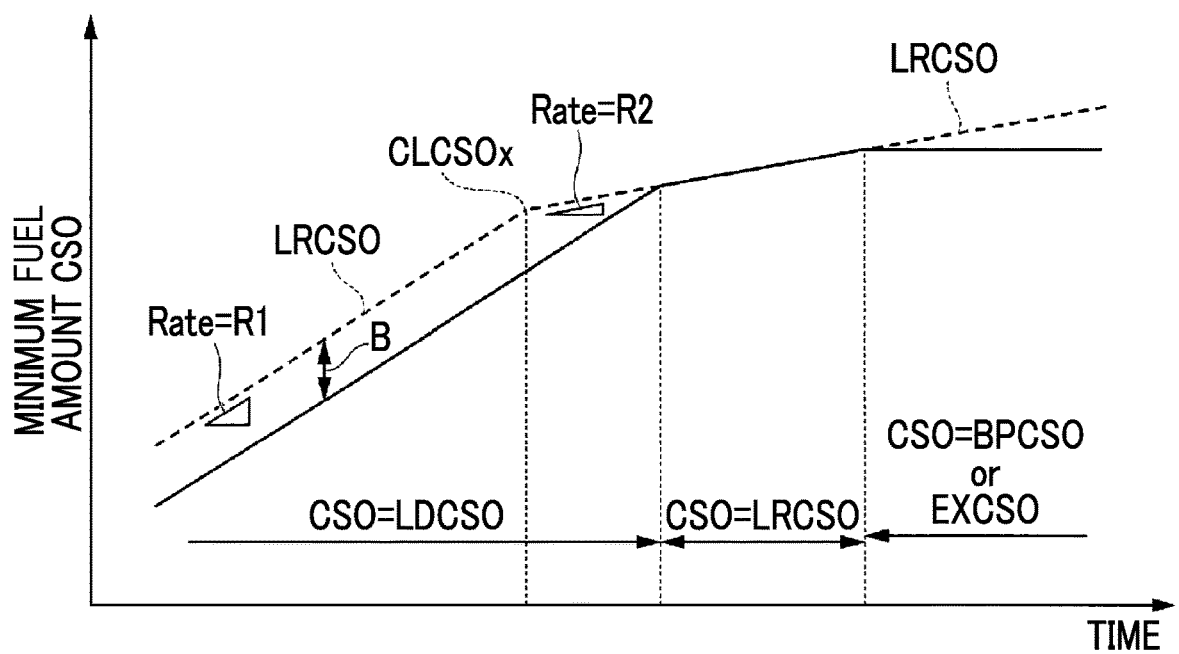
FIG. 5 is a graph showing a change in a minimum fuel amount with time according to an embodiment of the present invention.

In a process of increasing the minimum fuel amount CSO, the LRCSO calculator 129 obtains the change rate limit fuel amount LRCSO when the inlet temperature correlation value CLCSO is equal to or less than a predetermined value CLCSOx and the change rate limit fuel amount LRCSO when the inlet temperature correlation value CLCSO is larger than the predetermined value CLCSOx, respectively. When the inlet temperature correlation value CLCSO is equal to or less than the predetermined value CLCSOx, as shown in FIG. 5, the LRCSO calculator 129 sets a value in which a predetermined bias fuel amount B is added to the minimum fuel amount CSO and a change rate, which is a change amount per unit time of a value obtained by adding the bias fuel amount B to the minimum fuel amount CSO, is within a predetermined first limit value R1 as the change rate limit fuel amount LRCSO. When the inlet temperature correlation value CLCSO is larger than the predetermined value CLCSOx, the LRCSO calculator 129 changes the change rate limit fuel amount LRCSO from the change rate limit fuel amount LRCSO when the inlet temperature correlation value CLCSO is the predetermined value CLCSOx to a value that increases at a change rate equal to or less than a second limit value R2, which is smaller than the first limit value R1.

The predetermined value CLCSOx is, for example, a value larger than 95% and smaller than 99%. Accordingly, the change rate limit fuel amount LRCSO is a value for reducing a rate of increase in the fuel amount when the inlet temperature correlation value CLCSO becomes extremely close to 100%.

The low flow rate value selector 131 selects the minimum fuel amount CSO, which is the minimum fuel amount among the fuel amounts obtained by the LDCSO calculation unit 111 and the allowable fuel amount calculation unit 120, that is, the load fuel amount LDCSO, the first allowable temperature fuel amount BPCSO, the second allowable temperature fuel amount EXCSO, and the change rate limit fuel amount LRCSO. The valve command output unit 132 obtains an opening degree of the fuel regulation valve 36 according to the minimum fuel amount CSO and outputs a valve command indicating this opening degree to the fuel regulation valve 36.

In a process of increasing the required output PWd, the load fuel amount LDCSO according to the required output PWd initially becomes the minimum fuel amount CSO as shown in FIG. 5. Thereafter, the change rate limit fuel amount LRCSO becomes smaller than the load fuel amount LDCSO according to the required output PWd, and the change rate limit fuel amount LRCSO becomes the minimum fuel amount CSO. Further, the first allowable temperature fuel amount BPCSO or the second allowable temperature fuel amount EXCSO becomes smaller than the change rate limit fuel amount LRCSO as time elapses, and the first allowable temperature fuel amount BPCSO or the second allowable temperature fuel amount EXCSO becomes the minimum fuel amount CSO. As described above, the reason why the low flow rate value selector 131 selects the minimum fuel amount CSO from among the plurality of fuel amounts is from the viewpoint of protecting, and the like, the gas turbine 1.

As shown in FIG. 2, the IGV control unit 140 has a basic opening degree calculation unit (basic drive amount calculation unit) 141 that obtains an IGV basic opening degree IGVb (basic drive amount) of the IGV device 21, a fuel deviation calculation unit 142, a correction value calculation unit 146 that obtains a correction value of the IGV basic opening degree IGVb, a correction unit 150 that corrects the IGV basic opening degree IGVb with the correction value, and an IGV command output unit (regulator command output unit) 155 that outputs the IGV opening degree IGVo (regulator drive amount), which is the corrected IGV basic opening degree IGVb, to the IGV device 21.

Figure 6:
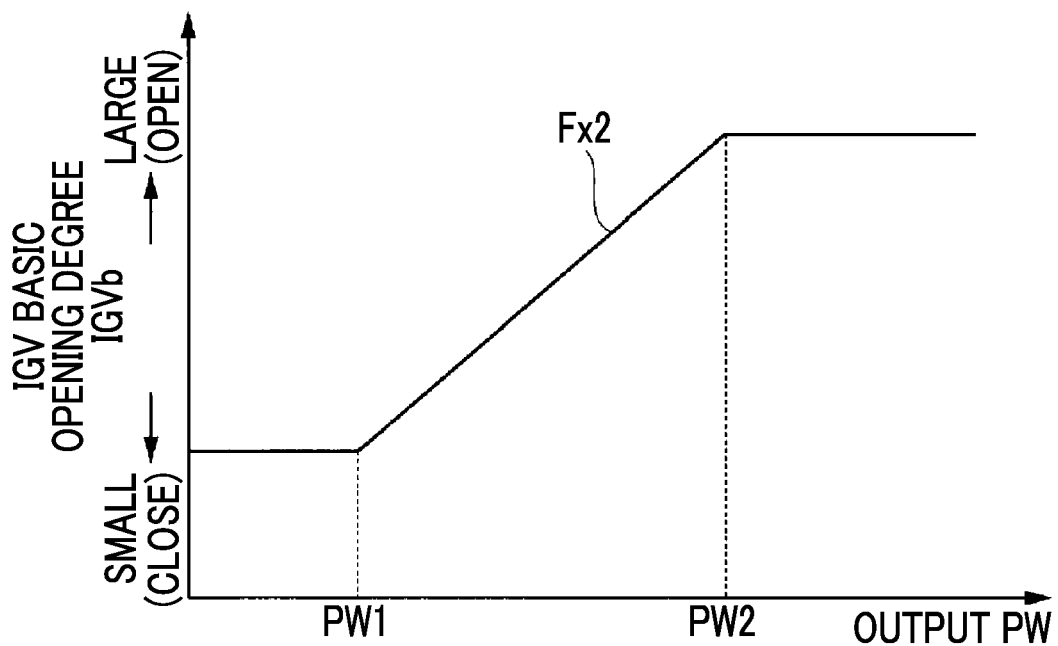
FIG. 6 is a graph showing a relationship between an actual output and an IGV basic opening degree (basic drive amount) according to an embodiment of the present invention.

The basic opening degree calculation unit 141 uses a function Fx2 to obtain the IGV basic opening degree IGVb. As shown in FIG. 6, the function Fx2 sets a minimum IGV opening degree in the IGV device 21 to the IGV basic opening degree IGVb in a case where the output (generator output) PW of the gas turbine 1 is equal to or less than a small first output PW1. The function Fx2 increases the IGV basic opening degree IGVb as the output PW increases when the output PW becomes larger than the first output PW1. The function Fx2 does not increase the IGV basic opening degree IGVb even though the output PW increases when the output PW becomes larger than a second output PW2 (>PW1).

The basic opening degree calculation unit 141 inputs the actual output PWr detected by the output meter 67 into the function Fx2 to obtain the IGV basic opening degree IGVb.

In order to obtain the IGV basic opening degree IGVb according to the status, the actual output PWr may be corrected by the air temperature Ti detected by the intake temperature sensor 64 or the atmospheric pressure Pi detected by the atmospheric pressure sensor 63. In this case, the basic opening degree calculation unit 141 uses the function Fx2 to obtain the IGV basic opening degree IGVb according to the corrected actual output PWr.

As shown in FIG. 2, the fuel deviation calculation unit 142 has a sub deviation calculation unit 143 and a low deviation value selector 145. The sub deviation calculation unit 143 obtains a deviation from the minimum fuel amount CSO for each of a plurality of types of allowable fuel amounts. Therefore, the sub deviation calculation unit 143 has a first differentiator 144a that obtains a deviation between the first allowable temperature fuel amount BPCSO and the minimum fuel amount CSO, a second differentiator 144b that obtains a deviation between the second allowable temperature fuel amount EXCSO and the minimum fuel amount CSO, and a third differentiator 144c that obtains a deviation between the change rate limit fuel amount LRCSO and the minimum fuel amount CSO.

The low deviation value selector 145 selects a minimum deviation $\Delta$min from the plurality of deviations obtained by the sub deviation calculation unit 143. That is, the low deviation value selector 145 selects the deviation between the allowable fuel amount closest to the minimum fuel amount CSO among the plurality of types of allowable fuel amounts and the minimum fuel amount CSO.

Figure 7:
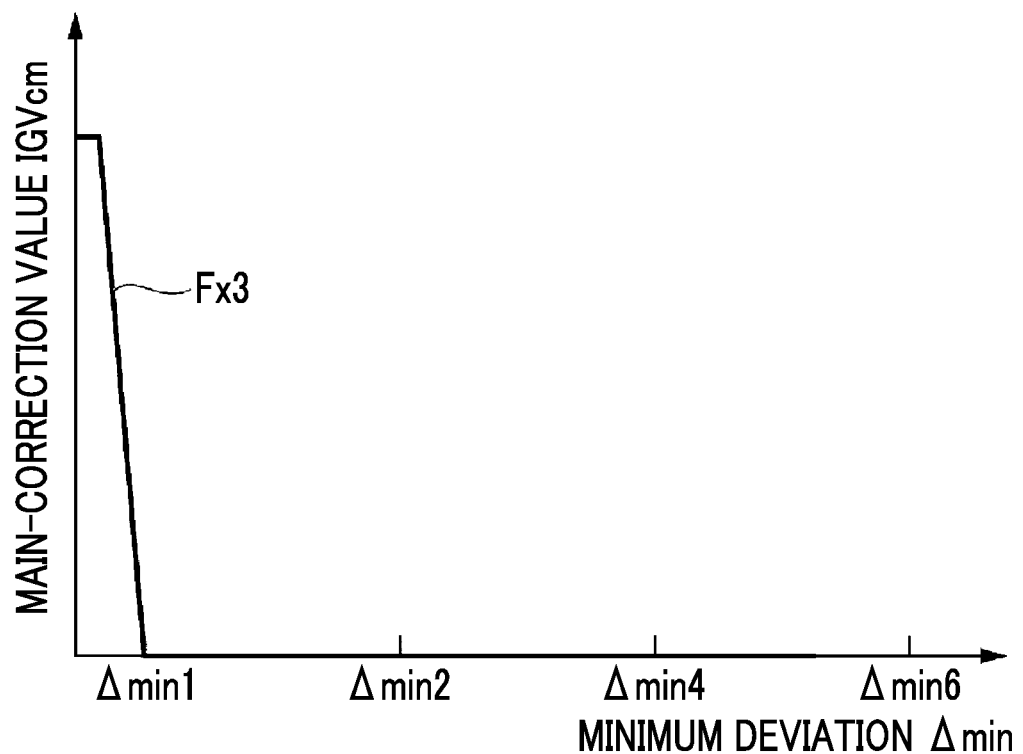
FIG. 7 is a graph showing a relationship between a minimum deviation and a main-correction value according to an embodiment of the present invention.

The correction value calculation unit 146 uses a function Fx3 to obtain a main-correction value IGVcm, which is a correction value of the IGV basic opening degree IGVb. As shown in FIG. 7, the function Fx3 sets the main-correction value IGVcm to zero when the minimum deviation $\Delta$min is larger than a value $\Delta$min1 which is sufficiently smaller than the maximum value of the minimum deviation $\Delta$min, and increases the main-correction value IGVcm as the deviation $\Delta$min becomes smaller when the minimum deviation $\Delta$min is equal to or less than the small value $\Delta$min1.

The correction unit 150 has a sub-correction value calculation unit 151 that obtains a sub-correction value IGVcs for correcting the main-correction value IGVcm, a sub-correction unit 152 that corrects the main-correction value IGVcm with the sub-correction value IGVcs, a change rate limiting unit 153 that limits a change rate of a main-correction value IGVcma corrected by the sub-correction unit 152, and a main-correction unit 154 that corrects the IGV basic opening degree IGVb with a main-correction value IGVcmb whose change rate is limited by the change rate limiting unit 153.

Figure 8:
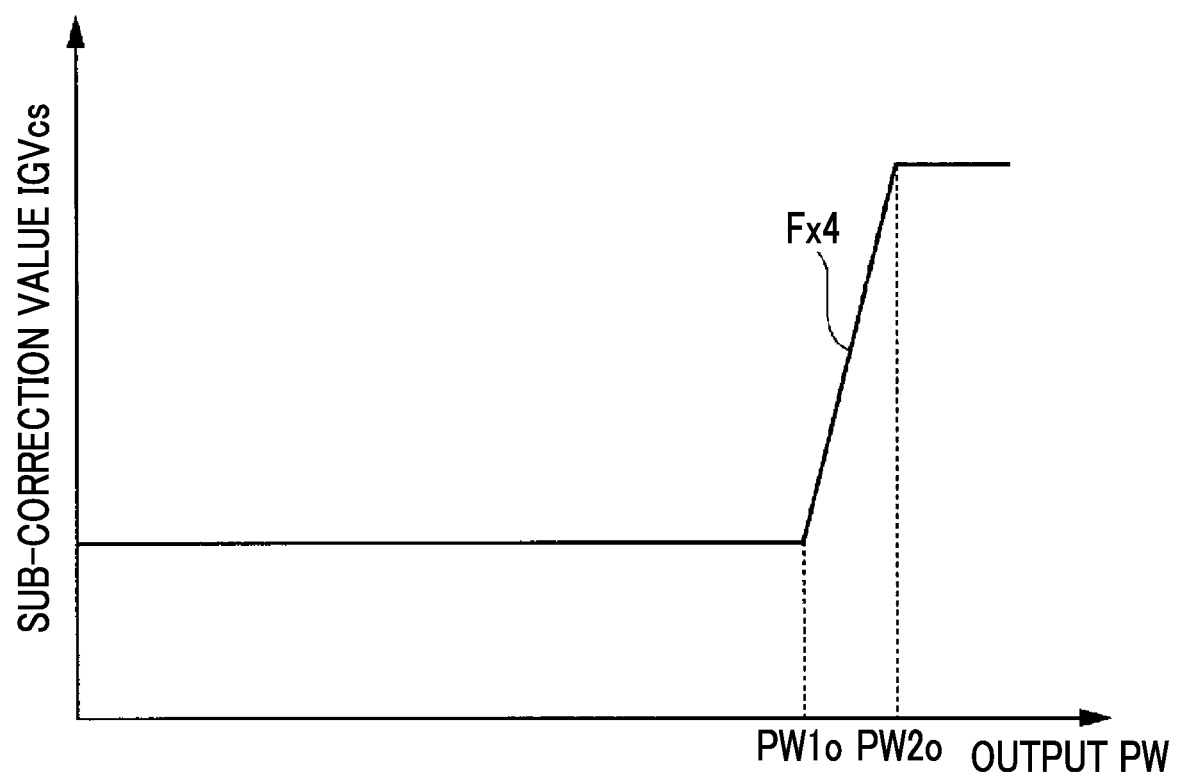
FIG. 8 is a graph showing a relationship between an actual output and a sub-correction value according to an embodiment of the present invention.
Figure 9:
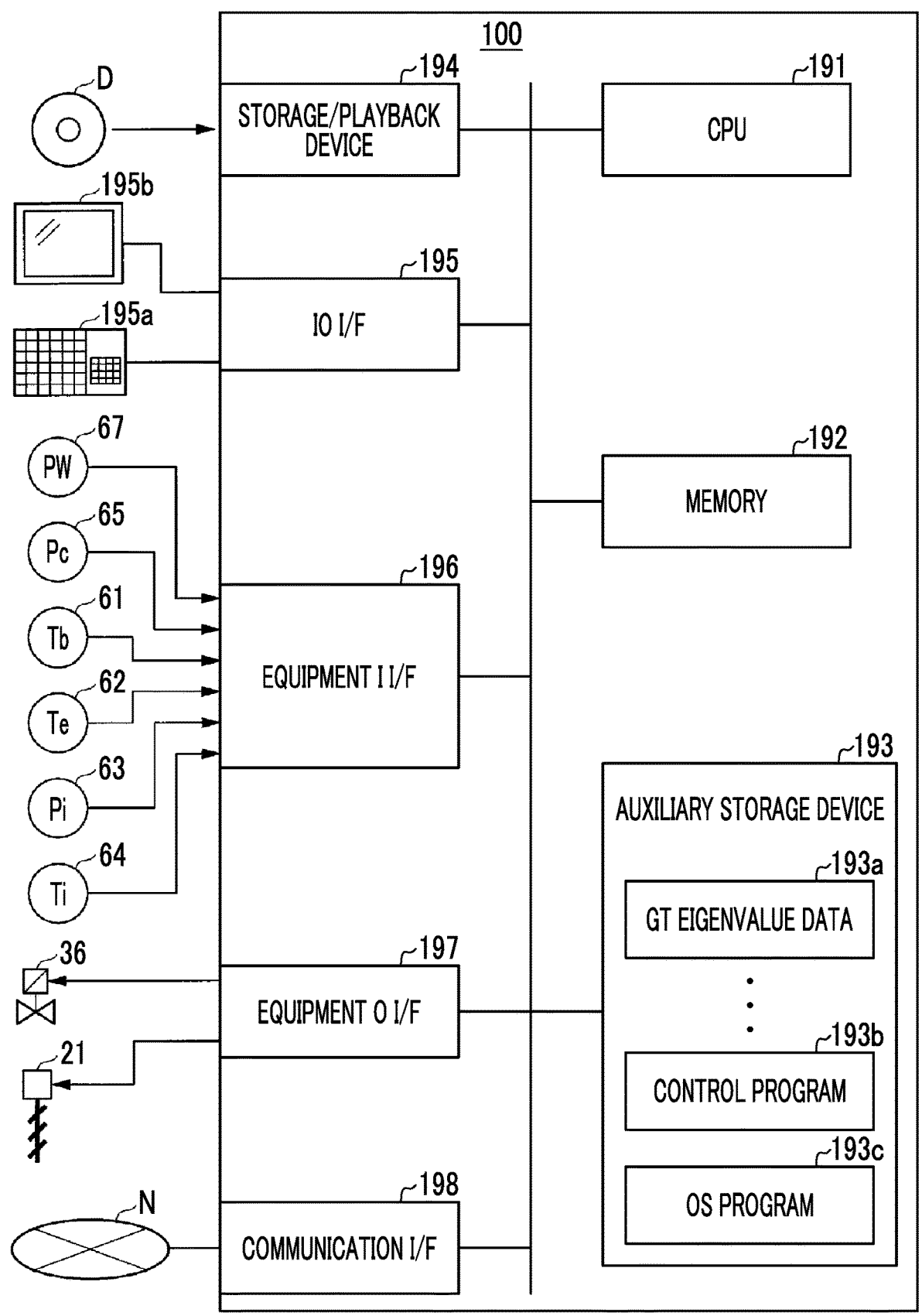
FIG. 9 is a circuit block diagram showing a hardware configuration of the control device according to an embodiment of the present invention.

The sub-correction value calculation unit 151 uses a function Fx4 to obtain the sub-correction value IGVcs. As shown in FIG. 8, the function Fx4 minimizes the sub-correction value IGVcs in a case where the output (generator output) PW of the gas turbine 1 is equal to or less than a small first output PW1o. The function Fx4 increases the sub-correction value IGVcs as the output PW increases when the output PW becomes larger than the first output PW1o. The function Fx4 does not increase the sub-correction value IGVcs even though the output PW increases when the output PW becomes larger than a second output PW2o (>PW1o).

The sub-correction value calculation unit 151 inputs the actual output PWr detected by the output meter 67 into the function Fx4 to obtain the sub-correction value IGVcs.

The first output PW1o herein is a larger output than the first output PW1 which is one of inflection points of the function Fx2 described with reference to FIG. 6. In order to obtain the sub-correction value IGVcs according to the status, the actual output PWr may be corrected by the air temperature Ti detected by the intake temperature sensor or the atmospheric pressure Pi detected by the atmospheric pressure sensor 63. In this case, the sub-correction value calculation unit 151 uses the function Fx4 to obtain the sub-correction value IGVcs according to the corrected actual output PWr.

The sub-correction unit 152 multiplies the main-correction value IGVcm by the sub-correction value IGVcs to correct the main-correction value IGVcm. Accordingly, the sub-correction unit 152 is a multiplier.

The change rate limiting unit 153 limits a change rate which is a change amount per unit time of the main-correction value IGVcma corrected by the sub-correction unit 152 within a predetermined limit value. For the limit value used by the change rate limiting unit 153, a limit value when the IGV basic opening degree IGVb is increased to increase the intake amount is different from a limit value when the IGV basic opening degree IGVb is decreased to decrease the intake amount. Specifically, the limit value of the change rate when the IGV basic opening degree IGVb is increased is larger than the limit value of the change rate when the IGV basic opening degree IGVb is decreased.

The main-correction unit 154 adds the main-correction value IGVcmb whose change rate is limited by the change rate limiting unit 153 to the IGV basic opening degree IGVb to correct the IGV basic opening degree IGVb. Accordingly, the main-correction unit 154 is an adder. The IGV basic opening degree IGVb corrected by the main-correction value IGVcmb is output to the IGV command output unit as the IGV opening degree IGVo (regulator drive amount).

The IGV command output unit 155 outputs the IGV command indicating the IGV opening degree IGVo (regulator drive amount) to the IGV device 21.

The control device 100 described above is a computer. Therefore, the control device 100 includes a CPU 191 that performs various calculations, a memory 192 that serves as a work area of the CPU 191, an auxiliary storage device 193 such as a hard disk drive device, a manual input device 195a such as a keyboard and a mouse, a display device 195b, an input/output interface 195 of the manual input device 195a and the display device 195b, an equipment I interface 196 for inputting signals from various detectors provided in the gas turbine 1 and the like, an equipment O interface 197 for outputting an operation amount to various operation terminals of the gas turbine 1, a communication interface 198 for communicating with the outside through a network N, and a storage/playback device 194 that performs a data storage process and a reproduction process on a disk-type storage medium D.

A gas turbine eigenvalue data 193a, a control program 193b, an operating system (OS) program 193c, and the like are stored in advance in the auxiliary storage device 193. The gas turbine eigenvalue data 193a includes, for example, the gas turbine output (generator output) when the turbine inlet temperature is the lower limit value under the standard environment. The control program 193b is a program for controlling the gas turbine 1. Various data and programs stored in the auxiliary storage device 193 are imported into the auxiliary storage device 193 from the disk-type storage medium D through the storage/playback device 194, for example. The various data and programs may be imported into the auxiliary storage device 193 from an external device through the communication interface 198. Further, the various data and programs may be imported into the auxiliary storage device 193 from the manual input device 195a through the input/output interface 195.

The CPU 191 expands the control program 193b stored in the auxiliary storage device 193 on the memory 192 and executes the control program 193b to realize each functional configuration of the control device 100.

Next, a basic operation of the gas turbine 1 will be described.

The compressor 10 of the gas turbine 1 compresses the air A to generate the compressed air. The compressed air is supplied to the combustor 30. The fuel F is also supplied to the combustor 30 from the fuel line 35. In the combustor 30, the fuel F is burned in the compressed air to generate high-temperature and high-pressure combustion gas. This combustion gas is sent into the turbine casing 48 to rotate the turbine rotor 41. The rotation of the turbine rotor 41 causes the generator 9 connected to the turbine rotor 41 to generate the electricity.

In the operation process of the gas turbine 1 as described above, the fuel regulation valve 36 or the IGV device 21 is controlled by the control device 100.

Next, the operation of the control device 100 will be described with reference to flowcharts shown in FIGS. 10 and 11.

Figure 10:
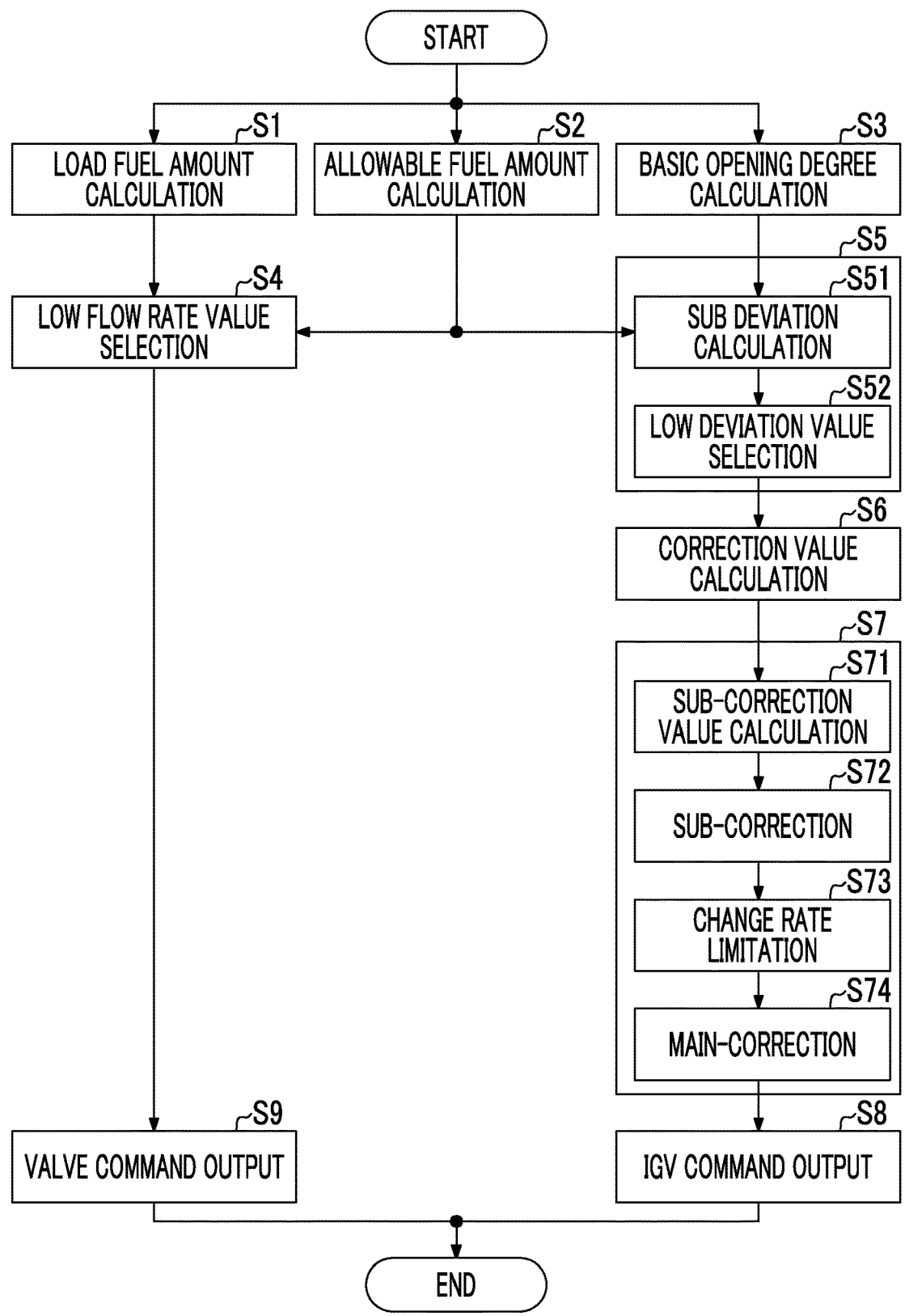
FIG. 10 is a flowchart showing an operation of the control device according to an embodiment of the present invention.

As shown in the flowchart of FIG. 10, the LDCSO calculation unit 111 receives the required output PWd and the actual output PWr detected by the output meter 67. The LDCSO calculation unit 111 obtains the load fuel amount LDCSO according to the deviation between the required output PWd and the actual output PWr (S1: load fuel amount calculation step).

The allowable fuel amount calculation unit 120 receives detection values from a plurality of detectors in parallel with the load fuel amount calculation step (S1) to obtain the allowable fuel amount according to the detection values (S2: allowable fuel amount calculation step).

Figure 11:
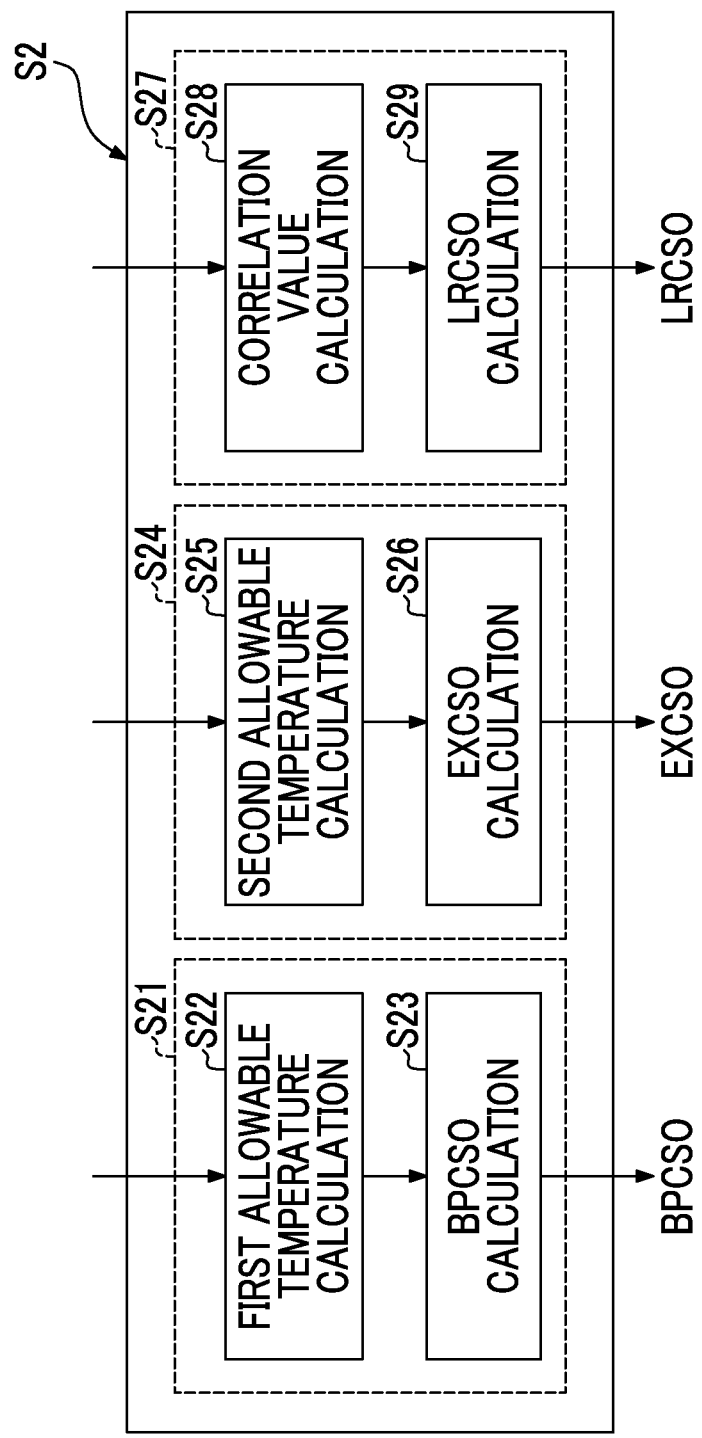
FIG. 11 is a flowchart showing a detailed step in an allowable fuel amount calculation step according to an embodiment according to the present invention.

In the allowable fuel amount calculation step (S2), a first allowable temperature fuel amount calculation step (BPCSO calculation step) (S21) by the BPCSO calculation unit 121a, a second allowable temperature fuel amount calculation step (EXCSO calculation step) (S24) by the ERXCSO calculation unit, and a change rate limit fuel amount calculation step (LRCSO calculation step) (S27) by the LRCSO calculation unit 127 are executed in parallel as shown in the flowchart of FIG. 11.

In the BPCSO calculation step (S21), first, the first allowable temperature calculation unit 122a of the BPCSO calculation unit 121a obtains the first allowable temperature (S22: first allowable temperature calculation step). The first allowable temperature calculation unit 122a receives the casing pressure Pc detected by the casing pressure sensor 65 to obtain the first allowable temperature according to the casing pressure Pc. As described above, the first allowable temperature is the allowable temperature of the exhaust gas EG at the first position in the turbine casing 48 or the exhaust duct 50. Next, the BPCSO calculation unit 124a of the BPCSO calculation unit 121a obtains the first allowable temperature fuel amount BPCSO (S23: first allowable temperature calculation step (BPCSO calculation step)). The BPCSO calculation unit 124a receives the temperature Tb of the exhaust gas EG at the first position detected by the first temperature sensor 61 to obtain the deviation between the temperature Tb of the exhaust gas EG and the first allowable temperature. The BPCSO calculation unit 124a obtains the first allowable temperature fuel amount BPCSO according to the deviation.

In the EXCSO calculation step (S24), first, the second allowable temperature calculation unit 122b of the EXCSO calculation unit 121b obtains the second allowable temperature (S25: second allowable temperature calculation step). The second allowable temperature calculation unit 122b receives the casing pressure Pc detected by the casing pressure sensor 65 to obtain the second allowable temperature according to the casing pressure Pc. As described above, the second allowable temperature is the allowable temperature of the exhaust gas EG at the second position in the exhaust duct 50. Next, the EXCSO calculation unit 124b of the EXCSO calculation unit 121b obtains the second allowable temperature fuel amount EXCSO (S26: second allowable temperature calculation step (EXCSO calculation step)). The EXCSO calculation unit 124b receives the temperature Te of the exhaust gas EG at the second position detected by the second temperature sensor 62 to obtain the deviation between the temperature Te of the exhaust gas EG and the second allowable temperature. The EXCSO calculation unit 124b obtains the second allowable temperature fuel amount EXCSO according to the deviation.

In the LRCSO calculation step (S27), first, the CLCSO calculator 128 of the LRCSO calculation unit 127 obtains the inlet temperature correlation value CLCSO (S28: correlation value calculation step). As described above, the CLCSO calculator 128 obtains the inlet temperature correlation value CLCSO by using the air temperature Ti detected by the intake temperature sensor 64, the atmospheric pressure Pi detected by the atmospheric pressure sensor 63, the actual output PWr detected by the output meter 67, and the IGV opening degree IGVo. Next, the LRCSO calculator 129 of the LRCSO calculation unit 127 obtains the change rate limit fuel amount LRCSO according to the inlet temperature correlation value CLCSO via the method described above (S29: change rate limit fuel amount calculation step (LRCSO calculation step)).

As described above, the allowable fuel amount calculation unit 120 receives parameters necessary for protecting the gas turbine 1 from damage from the plurality of detectors to obtain the allowable fuel amount that can protect the gas turbine 1 by using the parameters. As described above, the parameters in the present embodiment include the casing pressure Pc detected by the casing pressure sensor 65, the temperature Tb of the exhaust gas EG detected by the first temperature sensor 61, the temperature Te of the exhaust gas EG detected by the second temperature sensor 62, the air temperature Ti detected by the intake temperature sensor 64, the atmospheric pressure Pi detected by the atmospheric pressure sensor 63, the actual output PWr detected by the output meter 67, and the IGV opening degree IGVo. As described above, the allowable fuel amount in the present embodiment includes the first allowable temperature fuel amount BPCSO, the second allowable temperature fuel amount EXCSO, and the change rate limit fuel amount LRCSO. All of the allowable fuel amounts are the fuel amounts that can protect the gas turbine 1, particularly, the combustor 30 and the stator blade row 44 on the most axis upstream side Dau in the turbine 40 from thermal damage by basically setting the turbine inlet temperature to an allowable maximum temperature or less.

As shown in the flowchart of FIG. 10, the basic opening degree calculation unit (basic drive amount calculation unit) 141 obtains the IGV basic opening degree IGVb (basic drive amount) according to the actual output PWr detected by the output meter 67 in parallel with the load fuel amount calculation step (S1) and the allowable fuel amount calculation step (S2) (S3: basic opening degree calculation step (basic drive amount calculation step)).

Next, the low flow rate value selector 131 selects the minimum fuel amount CSO, which is the minimum fuel amount among the load fuel amount LDCSO obtained in the load fuel amount calculation step (S1) and the plurality of allowable fuel amounts obtained in the allowable fuel amount calculation step (S2) (S4: low flow rate value selection step). As described above, the allowable fuel amount obtained in the allowable fuel amount calculation step (S2) includes the first allowable temperature fuel amount BPCSO, the second allowable temperature fuel amount EXCSO, and the change rate limit fuel amount LRCSO.

Next, the fuel deviation calculation unit 142 obtains a deviation between the plurality of allowable fuel amounts obtained in the allowable fuel amount calculation step (S2) and the minimum fuel amount CSO selected in the low flow rate value selection step (S4) (S5: fuel deviation calculation step).

In the fuel deviation calculation step (S5), first, the sub deviation calculation unit 143 obtains the deviation from the minimum fuel amount CSO for each of the plurality of types of allowable fuel amounts (S51: sub deviation calculation step). Next, the low deviation value selector 145 selects the minimum deviation Δmin, which is the minimum deviation from the plurality of deviations (S52: low deviation value selection step). As described above, the plurality of deviations include the deviation between the first allowable temperature fuel amount BPCSO and the minimum fuel amount CSO, the deviation between the second allowable temperature fuel amount EXCSO and the minimum fuel amount CSO, and the deviation between the change rate limit fuel amount LRCSO and the minimum fuel amount CSO. The minimum deviation Δmin among the plurality of deviations is one of the parameters indicating there is an increased probability of damage to the gas turbine.

Next, the correction value calculation unit 146 obtains the main-correction value IGVcm, which is the correction value of the IGV basic opening degree IGVb, using the minimum deviation Δmin (S6: correction value calculation step). The main-correction value IGVcm becomes zero when the minimum deviation Δmin is larger than the small value Δmin1, as described above with reference to FIG. 7. That is, when the minimum deviation Δmin is large, the main-correction value IGVcm becomes zero and the IGV basic opening degree IGVb is not corrected. When the minimum deviation Δmin is equal to or less than the small value Δmin1, the main-correction value IGVcm becomes larger as the minimum deviation Δmin becomes smaller. Accordingly, the main-correction value IGVcm when the minimum deviation Δmin is the first deviation is equal to or larger than the main-correction value IGVcm when the minimum deviation Δmin is the second deviation smaller than the first deviation. That is, the smaller the minimum deviation Δmin is, the larger the main-correction value IGVcm is.

Next, the correction unit 150 corrects the IGV basic opening degree IGVb with the main-correction value IGVcm (S7: correction step). In the correction step (S7), a sub-correction value calculation step (S71), a sub-correction step (S72), a change rate limiting step (S73), and a main-correction step (S74) are executed.

In the sub-correction value calculation step (S71), the sub-correction value calculation unit 151 obtains the sub-correction value IGVcs according to the actual output PWr. As described with reference to FIG. 8, the sub-correction value calculation unit 151 minimizes the sub-correction value IGVcs when the actual output PWr is smaller than the first output PW1o, increases the sub-correction value IGVcs as the actual output PWr increases when the actual output PWr becomes larger than the first output PW1o, and does not increase the sub-correction value IGVcs even though the actual output PWr increases when the actual output PWr is larger than the second output PW2o. Accordingly, the sub-correction value IGVcs when the actual output PWr is a first value is equal to or larger than the sub-correction value IGVcs when the actual output PWr is a second value smaller than the first value. That is, the larger the actual output PWr is, the larger the sub-correction value IGVcs is.

In the sub-correction step (S72), the sub-correction unit 152 multiplies the main-correction value IGVcm by the sub-correction value IGVcs to correct the main-correction value IGVcm. Therefore, the main-correction value IGVcma corrected when the sub-correction value IGVcs is the first value is larger than the main-correction value IGVcma corrected when the sub-correction value IGVcs is the second value smaller than the first value. Accordingly, the larger the actual output PWr is, the larger the corrected main-correction value IGVcma is.

In the change rate limiting step (S73), the change rate of the main-correction value IGVcma corrected by the sub-correction unit 152 is limited within a predetermined limit value. As described above, for the limit value used by the change rate limiting unit 153, the limit value of the change rate when the IGV opening degree is increased is larger than the limit value of the change rate when the IGV opening degree is decreased.

In the main-correction step (S74), the main-correction unit 154 corrects the IGV basic opening degree IGVb. In this case, the main-correction unit 154 adds the main-correction value IGVcmb whose change rate is limited to the IGV basic opening degree IGVb. The main-correction value IGVcmb is a positive value. Accordingly, the IGV basic opening degree IGVb is increased by the correction by the correction unit 150.

The IGV basic opening degree IGVb corrected by the main-correction unit 154 is output to the IGV command output unit 155 as the IGV opening degree IGVo. The IGV command output unit 155 creates the IGV command indicating the IGV opening degree IGVo and outputs the IGV command to the IGV device 21 (S8: IGV command output step). As a result, the opening degree of the IGV device 21 becomes the IGV opening degree IGVo.

The valve command output unit 132 obtains the opening degree of the fuel regulation valve 36 according to the minimum fuel amount CSO selected in the low flow rate value selection step (S4). The valve command output unit 132 outputs the valve command indicating the opening degree to the fuel regulation valve 36 (S9: valve command output step). As a result, the fuel regulation valve 36 has the opening degree indicated by the valve command, and the fuel with the minimum fuel amount CSO flows through the fuel regulation valve 36.

Consequently, a series of processes by the control device 100 ends. The series of processes is repeatedly executed while the gas turbine 1 is driven.

As described above, in the present embodiment, the IGV basic opening degree IGVb is corrected according to the magnitude of the minimum deviation Δmin, which is one of the parameters indicating there is an increased probability of damage to the gas turbine. Therefore, in the present embodiment, the IGV basic opening degree IGVb is corrected when the probability of damage to the gas turbine is increased to regulate the flow rate of the air flowing into the gas turbine 1. As a result, in the present embodiment, when the probability of damage to the gas turbine is increased, the turbine inlet temperature of the combustion gas or the temperature of the exhaust gas EG in the exhaust duct 50 is regulated. Therefore, it is possible to suppress the damage to the gas turbine 1. Further, in the present embodiment, when the probability of damage to the gas turbine is not increased, the IGV basic opening degree IGVb is not corrected and the flow rate of the air flowing into the gas turbine 1 is not regulated. That is, when the probability of damage to the gas turbine is not increased, the flow rate of the air flowing into the gas turbine 1 does not become larger than the flow rate of the air corresponding to the IGV basic opening degree IGVb. As a result, in the present embodiment, when the probability of damage to the gas turbine is not increased, energy consumed by the compressor 10 does not increase with respect to output energy of the turbine 40 alone. Therefore, it is possible to suppress the decrease in gas turbine efficiency.

The gas turbine 1 is more likely to be damaged when the actual output PWr is large than when the actual output PWr is small. In the present embodiment, a main-correction value IGVcm is corrected by a sub-correction value IGVcs according to the actual output PWr, and the IGV basic opening degree IGVb is corrected by the corrected main-correction value. That is, in the present embodiment, the main-correction value is corrected when the actual output PWr is large and the probability of damage to the gas turbine damage is high. Accordingly, in the present embodiment, it is possible to suppress the damage to the gas turbine 1 from this viewpoint as well.

In the gas turbine 1, when the IGV basic opening degree IGVb obtained by the basic opening degree calculation unit 141 is large, that is, when the intake amount is large, the fuel amount supplied to the combustor 30 increases. Therefore, the gas turbine 1 is more likely to be damaged when the IGV basic opening degree IGVb is larger than when the IGV basic opening degree IGVb obtained by the basic opening degree calculation unit 141 is smaller. In the present embodiment, the limit value relating to the correction value change rate when the IGV basic opening degree IGVb is increased to increase the intake amount is larger than the limit value relating to the correction value change rate when the IGV basic opening degree IGVb is decreased to decrease the intake amount. Therefore, in the present embodiment, the correction value change rate when the IGV basic opening degree IGVb is increased to increase the intake amount is larger than the correction value change rate when the IGV basic opening degree IGVb is decreased to decrease the intake amount. Accordingly, in the present embodiment, it is possible to suppress the damage to the gas turbine 1 from this viewpoint as well.

Modification Example

In the above embodiment, the first allowable temperature fuel amount BPCSO, the second allowable temperature fuel amount EXCSO, and the change rate limit fuel amount LRCSO are obtained as the allowable fuel amount. However, any one of the allowable fuel amounts, for example only the first allowable temperature fuel amount BPCSO, may be obtained as the allowable fuel amount. In this case, it is not necessary to obtain the deviation from the minimum fuel amount CSO for each of the plurality of allowable fuel amounts. Therefore, the low deviation value selector 145 is unnecessary. As the allowable fuel amount, only the first allowable temperature fuel amount BPCSO and the second allowable temperature fuel amount EXCSO may be obtained, and the change rate limit fuel amount LRCSO may not be obtained.

The correction unit 150 of the present embodiment has the sub-correction value calculation unit 151, the sub-correction unit 152, the change rate limiting unit 153, and the main-correction unit 154. However, the correction unit 150 may not have the sub-correction value calculation unit 151 and the sub-correction unit 152 among the above units. In this case, the change rate limiting unit 153 limits the change rate of the main-correction value IGVcm obtained by the correction value calculation unit 146. The correction unit 150 may not have the change rate limiting unit 153 among the above units. In this case, the IGV basic opening degree IGVb is corrected by the main-correction value IGVcma which is corrected by the sub-correction unit 152 and whose change rate is not limited. Further, the correction unit 150 may not have the sub-correction value calculation unit 151, the sub-correction unit 152, and the change rate limiting unit 153. In this case, the IGV basic opening degree IGVb is corrected by the main-correction value IGVcm obtained by the correction value calculation unit 146.

INDUSTRIAL APPLICABILITY

According to one aspect of the present invention, it is possible to suppress the decrease in gas turbine efficiency while suppressing damage to the gas turbine.

REFERENCE SIGNS LIST

1: gas turbine
2: gas turbine rotor
9: generator
10: compressor
11: compressor rotor
12: rotor shaft portion
13: rotor blade row
14: stator blade row
18: compressor casing
21: IGV device (intake amount regulator)
22: movable blade
23: driver
30: combustor
35: fuel line
36: fuel regulation valve
38: intermediate casing
40: turbine
41: turbine rotor
42: rotor shaft portion
43: rotor blade row
43a: last-stage rotor blade row
44: stator blade row
48: turbine casing
50: exhaust duct
61: first temperature sensor
62: second temperature sensor
63: atmospheric pressure sensor
64: intake temperature sensor
65: casing pressure sensor
66: rotation speed meter
67: output meter
100: control device
110: fuel control unit
111: load fuel amount calculation unit (LDCSO calculation unit)
112: differentiator
113: PI controller
120: allowable fuel amount calculation unit
121: allowable temperature fuel amount calculation unit
121a: first allowable temperature fuel amount calculation unit (BPCSO calculation unit)
122a: first allowable temperature calculation unit
123: temperature bias device
124a: first allowable temperature fuel amount calculation unit (BPCSO calculation unit)
125a: differentiator
126a: PI controller
121b: second allowable temperature fuel amount calculation unit (EXCSO calculation unit)
122b: second allowable temperature calculation unit
124b: second allowable temperature fuel amount calculation unit (EXCSO calculation unit)
125b: differentiator
126b: PI controller
127: change rate limit fuel amount calculation unit (LRCSO calculation unit)
128: inlet temperature correlation value calculator (CLCSO calculator)
129: change rate limit fuel amount calculator (LRCSO calculator)
131: low flow rate value selector
132: valve command output unit
140: IGV control unit
141: basic opening degree calculation unit (basic drive amount calculation unit)
142: fuel deviation calculation unit
143: sub deviation calculation unit
144a: first differentiator
144b: second differentiator
144c: third differentiator
145: low deviation value selector
146: correction value calculation unit
150: correction unit
151: sub-correction value calculation unit
152: sub-correction unit
153: change rate limiting unit
154: main-correction unit
155: IGV command output unit (regulator command output unit)
191: CPU
192: memory
193: auxiliary storage device
193a: gas turbine eigenvalue data
193b: control program
193c: operating system (OS) program
194: storage/playback device
195: input/output interface
195a: manual input device
195b: display device
196: equipment I interface
197: equipment O interface
198: communication interface
A: air
F: fuel
EG: exhaust gas
Ar: axis
Da: axial direction
Dau: axis upstream side
Dad: axis downstream side
Dc: circumferential direction
Dr: radial direction

The invention claimed is:

1. A control device of a gas turbine including a compressor that compresses air, a combustor that burns fuel in the air compressed by the compressor to generate combustion gas, a turbine driven by the combustion gas, and a fuel regulation valve that regulates a flow rate of the fuel supplied to the combustor, in which the compressor has a rotating compressor rotor, a compressor casing that covers the compressor rotor, and an intake amount regulator that regulates an intake amount that is a flow rate of the air flowing into the compressor casing, the control device comprising:

a load fuel amount calculation unit that receives an actual output of the gas turbine, and a required output required for the gas turbine to obtain a load fuel amount determined according to an output deviation which is a deviation between the actual output and the required output;

an allowable fuel amount calculation unit that receives parameters for protecting the gas turbine and uses the parameters to obtain an allowable fuel amount capable of protecting the gas turbine, the parameters defining a turbine inlet temperature, which is a temperature of the combustion gas at an inlet of the turbine, and an exhaust gas temperature, which is a temperature of the combustion gas exhausted from the turbine;

a low flow rate value selector that selects a minimum fuel amount, which is the minimum fuel amount among fuel amounts obtained by the load fuel amount calculation unit and the allowable fuel amount calculation unit;

a valve command output unit that obtains an opening degree of the fuel regulation valve according to the minimum fuel amount selected by the low flow rate value selector and outputs a valve command value indicating the opening degree to the fuel regulation valve;

a basic drive amount calculation unit that receives the actual output to obtain a basic drive amount which is a drive amount of the intake amount regulator determined according to the actual output;

a fuel deviation calculation unit that obtains a fuel deviation which is a deviation between the allowable fuel amount and the minimum fuel amount;

a correction value calculation unit that obtains a correction value of the basic drive amount according to the fuel deviation obtained by the fuel deviation calculation unit;

a correction unit that corrects the basic drive amount with the correction value; and a regulator command output unit that outputs a regulator command indicating a regulator drive amount, which is the basic drive amount corrected by the correction unit, to the intake amount regulator.

2. The control device of the gas turbine according to claim 1, wherein the correction value when the fuel deviation is a first deviation is equal to or less than the correction value when the fuel deviation is a second deviation smaller than the first deviation.

3. The control device of the gas turbine according to claim 1, wherein the correction unit includes a sub-correction value calculation unit that obtains a sub-correction value for correcting a main-correction value which is the correction value, a sub-correction unit that corrects the main-correction value with the sub-correction value, and a main-correction unit that corrects the basic drive amount with the main-correction value corrected by the sub-correction unit to obtain the regulator drive amount, and wherein the sub-correction value calculation unit receives the actual output to obtain the sub-correction value according to the actual output.

4. The control device of the gas turbine according to claim 3, wherein the sub-correction value when the actual output is a first value is equal to or larger than the sub-correction value when the actual output is a second value smaller than the first value, and wherein the sub-correction unit corrects the main-correction value such that the main-correction value corrected when the sub-correction value is the first value is larger than the main-correction value corrected when the sub-correction value is the second value smaller than the first value.

5. The control device of the gas turbine according to claim 3, wherein the correction unit has a change rate limiting unit that limits a change rate which is a change amount per unit time of the main-correction value corrected by the sub-correction unit within a predetermined limit value, wherein the limit value for the change rate when the basic drive amount is increased to increase the intake amount is larger than the limit value for the change rate when the basic drive amount is decreased to decrease the intake amount, and wherein the main-correction unit corrects the basic drive amount with the main-correction value whose change rate is limited by the change rate limiting unit.

6. The control device of the gas turbine according to claim 1, wherein the correction unit has a change rate limiting unit that limits a change rate which is a change amount per unit time of the correction value within a predetermined limit value and a main-correction unit that corrects the basic drive amount with the correction value whose change rate is limited by the change rate limiting unit, and wherein the limit value for the change rate when the basic drive amount is increased to increase the intake amount is larger than the limit value for the change rate when the basic drive amount is decreased to decrease the intake amount.

7. The control device of the gas turbine according to claim 1, wherein the allowable fuel amount calculation unit obtains a plurality of types of allowable fuel amounts, wherein the fuel deviation calculation unit has a sub deviation calculation unit that obtains a deviation from the minimum fuel amount for each of the plurality of types of allowable fuel amounts and a low deviation value selector that selects a minimum deviation, which is the minimum deviation among the deviations for each of the plurality of types of allowable fuel amounts obtained by the sub deviation calculation unit, and wherein the correction value calculation unit obtains the correction value according to the minimum deviation.

8. The control device of the gas turbine according to claim 7, wherein the turbine has a turbine rotor that rotates around an axis and a turbine casing that covers the turbine rotor, wherein the turbine rotor has a rotor shaft portion that rotates around the axis and a plurality of rotor blade rows that are disposed side by side in an axial direction in which the axis extends and are fixed to the rotor shaft portion, wherein the gas turbine has an exhaust duct that is connected to the turbine casing and through which exhaust gas, which is combustion gas that has passed through a last-stage rotor blade row among the plurality of rotor blade rows, flows, wherein the allowable fuel amount calculation unit has a first allowable temperature calculation unit that obtains a first allowable temperature, which is an allowable exhaust gas temperature according to a state of the gas turbine, with respect to the temperature of the exhaust gas at a first position on a downstream side of the last-stage rotor blade row in the turbine casing or the exhaust duct, a second allowable temperature calculation unit that obtains a second allowable temperature, which is an allowable exhaust gas temperature according to the state of the gas turbine, with respect to the temperature of the exhaust gas at a second position on a downstream side of the first position in the exhaust duct, a first allowable temperature fuel amount calculation unit that receives the temperature of the exhaust gas at the first position to obtain a first allowable temperature fuel amount determined according to a deviation between the temperature of the exhaust gas at the first position and the first allowable temperature, and a second allowable temperature fuel amount calculation unit that receives the temperature of the exhaust gas at the second position to obtain a second allowable temperature fuel amount determined according to a deviation between the temperature of the exhaust gas at the second position and the second allowable temperature, wherein the low flow rate value selector processes each of the first allowable temperature fuel amount and the second allowable temperature fuel amount as one of the fuel amounts obtained by the allowable fuel amount calculation unit, and wherein the sub deviation calculation unit uses the first allowable temperature fuel amount as one type of allowable fuel amount of a plurality of types of allowable fuel amounts and uses the second allowable temperature fuel amount as another type of allowable fuel amount.

9. The control device of the gas turbine according to claim 7, wherein the allowable fuel amount calculation unit has:
a correlation value calculator that obtains an inlet temperature correlation value having a positive correlation with the temperature of the combustion gas at the inlet of the turbine according to a state of the gas turbine, and
a change rate limit fuel amount calculator that obtains a change rate limit fuel amount according to the inlet temperature correlation value, wherein the change rate limit fuel amount calculator obtains the change rate limit fuel amount when the inlet temperature correlation value is equal to or less than a predetermined value and the change rate limit fuel amount when the inlet temperature correlation value is larger than the predetermined value, in a process of increasing the minimum fuel amount, wherein the change rate limit fuel amount when the inlet temperature correlation value is equal to or less than the predetermined value is a value in which a predetermined bias fuel amount is added to the minimum fuel amount and a change rate which is a change amount per unit time of a value obtained by adding the predetermined bias fuel amount to the minimum fuel amount is within a predetermined first limit value, wherein the change rate limit fuel amount when the inlet temperature correlation value is larger than the predetermined value is a value that increases at a change rate equal to or less than a second limit value, which is smaller than the first limit value, from the change rate limit fuel amount when the inlet temperature correlation value is the predetermined value, wherein the low flow rate value selector processes the change rate limit fuel amount as one of the fuel amounts obtained by the allowable fuel amount calculation unit, and wherein the sub deviation calculation unit uses the change rate limit fuel amount as one type of allowable fuel amount of a plurality of types of allowable fuel amounts.

10. The control device of the gas turbine according to claim 1, wherein the turbine has a turbine rotor that rotates around an axis and a turbine casing that covers the turbine rotor, wherein the turbine rotor has a rotor shaft portion that rotates around the axis and a plurality of rotor blade rows that are disposed side by side in an axial direction in which the axis extends and are fixed to the rotor shaft portion, wherein the gas turbine has an exhaust duct that is connected to the turbine casing and through which exhaust gas, which is combustion gas that has passed through a last-stage rotor blade row among the plurality of rotor blade rows, flows, wherein the allowable fuel amount calculation unit has an allowable temperature calculation unit that obtains an allowable exhaust gas temperature according to a state of the gas turbine with respect to a temperature of the exhaust gas and an allowable temperature fuel amount calculation unit that receives the temperature of the exhaust gas to obtain an allowable temperature fuel amount determined according to a deviation between the temperature of the exhaust gas and the allowable exhaust gas temperature, and wherein the low flow rate value selector and the fuel deviation calculation unit each process the allowable temperature fuel amount as the allowable fuel amount obtained by the allowable fuel amount calculation unit.

11. A gas turbine equipment comprising:
the control device of the gas turbine according to claim 1; and
the gas turbine.

12. A control method of a gas turbine including a compressor that compresses air, a combustor that burns fuel in the air compressed by the compressor to generate combustion gas, a turbine driven by the combustion gas, and a fuel regulation valve that regulates a flow rate of the fuel supplied to the combustor, in which the compressor has a rotating compressor rotor, a compressor casing that covers the compressor rotor, and an intake amount regulator that regulates an intake amount that is a flow rate of the air flowing into the compressor casing, the control method comprising:

a load fuel amount calculation step of receiving an actual output of the gas turbine, and a required output required for the gas turbine to obtain a load fuel amount determined according to an output deviation which is a deviation between the actual output and the required output;

an allowable fuel amount calculation step of receiving parameters for protecting the gas turbine and using the parameters to obtain an allowable fuel amount capable of protecting the gas turbine, the parameters defining a turbine inlet temperature, which is a temperature of the combustion gas at an inlet of the turbine, and an exhaust gas temperature, which is a temperature of the combustion gas exhausted from the turbine;
a low flow rate value selection step of selecting a minimum fuel amount, which is the minimum fuel amount among the fuel amounts obtained in the load fuel amount calculation step and the allowable fuel amount calculation step;
a valve command output step of obtaining an opening degree of the fuel regulation valve according to the minimum fuel amount selected in the low flow rate value selection step and outputting a valve command value indicating the opening degree to the fuel regulation valve;
a basic drive amount calculation step of receiving the actual output to obtain a basic drive amount which is a drive amount of the intake amount regulator determined according to the actual output;
a fuel deviation calculation step of obtaining a fuel deviation which is a deviation between the allowable fuel amount and the minimum fuel amount;
a correction value calculation step of obtaining a correction value of the basic drive amount according to the fuel deviation obtained in the fuel deviation calculation step;
a correction step of correcting the basic drive amount with the correction value; and
a regulator command output step of outputting a regulator command indicating a regulator drive amount, which is the basic drive amount corrected in the correction step, to the intake amount regulator.

13. The control method of the gas turbine according to claim 12,
wherein the correction step includes a sub-correction value calculation step of obtaining a sub-correction value for correcting a main-correction value which is the correction value, a sub-correction step of correcting the main-correction value with the sub-correction value, and a main-correction step of correcting the basic drive amount with the main-correction value corrected in the sub-correction step to obtain the regulator drive amount, and
wherein in the sub-correction value calculation step, the actual output is received to obtain the sub-correction value according to the actual output.

14. The control method of the gas turbine according to claim 13,
wherein the correction step includes a change rate limiting step of limiting a change rate which is a change amount per unit time of the main-correction value corrected in the sub-correction step within a predetermined limit value,
wherein the limit value for the change rate when the basic drive amount is increased to increase the intake amount is larger than the limit value for the change rate when the basic drive amount is decreased to decrease the intake amount, and
wherein in the main-correction step, the basic drive amount is corrected with the main-correction value whose change rate is limited in the change rate limiting step.

15. The control method of the gas turbine according to claim 12,
wherein, in the allowable fuel amount calculation step, a plurality of types of allowable fuel amounts are obtained,
wherein the fuel deviation calculation step includes:
a sub deviation calculation step of obtaining a deviation from the minimum fuel amount for each of the plurality of types of allowable fuel amounts, and
a low deviation value selection step of selecting a minimum deviation, which is the minimum deviation among the deviations for each of the plurality of types of allowable fuel amounts obtained in the sub deviation calculation step, and
wherein in the correction value calculation step, a correction value of the basic drive amount according to the minimum deviation is obtained.

16. A control program of a gas turbine including a compressor that compresses air,
a combustor that burns fuel in the air compressed by the compressor to generate combustion gas,
a turbine driven by the combustion gas, and
a fuel regulation valve that regulates a flow rate of the fuel supplied to the combustor,
wherein the compressor has a rotating compressor rotor, a compressor casing that covers the compressor rotor, and an intake amount regulator that regulates an intake amount that is a flow rate of the air flowing into the compressor casing,
wherein the control program causing a computer to execute:
a load fuel amount calculation step of receiving an actual output of the gas turbine, and a required output required for the gas turbine to obtain a load fuel amount determined according to an output deviation which is a deviation between the actual output and the required output;
an allowable fuel amount calculation step of receiving parameters for protecting the gas turbine and using the parameters to obtain an allowable fuel amount capable of protecting the gas turbine, the parameters defining a turbine inlet temperature, which is a temperature of the combustion gas at an inlet of the turbine, and an exhaust gas temperature, which is a temperature of the combustion gas exhausted from the turbine;
a low flow rate value selection step of selecting a minimum fuel amount, which is the minimum fuel amount among the fuel amounts obtained in the load fuel amount calculation step and the allowable fuel amount calculation step;
a valve command output step of obtaining an opening degree of the fuel regulation valve according to the minimum fuel amount selected in the low flow rate value selection step and outputting a valve command value indicating the opening degree to the fuel regulation valve;
a basic drive amount calculation step of receiving the actual output to obtain a basic drive amount which is a drive amount of the intake amount regulator determined according to the actual output;
a fuel deviation calculation step of obtaining a fuel deviation which is a deviation between the allowable fuel amount and the minimum fuel amount;
a correction value calculation step of obtaining a correction value of the basic drive amount according to the fuel deviation obtained in the fuel deviation calculation step;
a correction step of correcting the basic drive amount with the correction value; and
a regulator command output step of outputting a regulator command indicating a regulator drive amount, which is the basic drive amount corrected in the correction step, to the intake amount regulator.

\* \* \* \* \*